(12) United States Patent
Wang

(10) Patent No.: US 9,928,130 B2
(45) Date of Patent: Mar. 27, 2018

(54) METHOD FOR GENERATING A MACHINE HEARTBEAT

(71) Applicant: BEET, LLC, Plymouth, MI (US)

(72) Inventor: David J. Wang, Northville, MI (US)

(73) Assignee: BEET, LLC, Plymouth, MI (US)

( * ) Notice: Subject to any disclaimer, the term of this patent is extended or adjusted under 35 U.S.C. 154(b) by 268 days.

(21) Appl. No.: 14/833,799

(22) Filed: Aug. 24, 2015

(65) Prior Publication Data

US 2015/0363251 A1    Dec. 17, 2015

Related U.S. Application Data

(63) Continuation-in-part of application No. 14/509,423, filed on Oct. 8, 2014, now Pat. No. 9,116,740, which is a continuation of application No. 13/486,275, filed on Jun. 1, 2012, now Pat. No. 8,880,442.

(60) Provisional application No. 61/493,412, filed on Jun. 3, 2011.

(51) Int. Cl.
  *G06F 11/07* (2006.01)
  *G06F 9/46* (2006.01)
  *G06F 11/30* (2006.01)

(52) U.S. Cl.
  CPC ............ *G06F 11/0757* (2013.01); *G06F 9/46* (2013.01); *G06F 11/079* (2013.01); *G06F 11/3006* (2013.01); *G06F 11/3082* (2013.01)

(58) Field of Classification Search
  None
  See application file for complete search history.

(56) References Cited

U.S. PATENT DOCUMENTS

| | | | | |
|---|---|---|---|---|
| 3,795,916 A | * | 3/1974 | Wallace | G05B 19/048 700/33 |
| 7,539,597 B2 | * | 5/2009 | Wegerich | G05B 23/0254 700/108 |
| 7,693,608 B2 | * | 4/2010 | Nasle | G05B 17/02 323/212 |
| 2001/0013247 A1 | | 8/2001 | Wilson et al. | |
| 2003/0139905 A1 | * | 7/2003 | Helsper | G06F 11/3006 702/182 |
| 2007/0067678 A1 | * | 3/2007 | Hosek | G05B 23/0235 714/25 |
| 2012/0310865 A1 | | 12/2012 | Wang | |

* cited by examiner

*Primary Examiner* — Alan S Chen
(74) *Attorney, Agent, or Firm* — Quinn IP Law

(57) ABSTRACT

A method and system for generating a heartbeat of a process including at least one machine configured to perform a process cycle consisting of timed events performed in a process sequence includes determining the duration of each timed event during performance of the process cycle, ordering the durations of the timed events in the process sequence, and generating a heartbeat defined by the ordered durations of a process cycle. One or more process parameters can be sensed and displayed with the heartbeat in real time. The variance of a current heartbeat to a baseline heartbeat and/or a comparison of a process parameter to a parameter limit can be analyzed to monitor and/or control the process or machine. The heartbeat, the process parameter corresponding to the heartbeat can be displayed on a user interface which can include a message corresponding to the heartbeat and/or the process parameter.

25 Claims, 10 Drawing Sheets

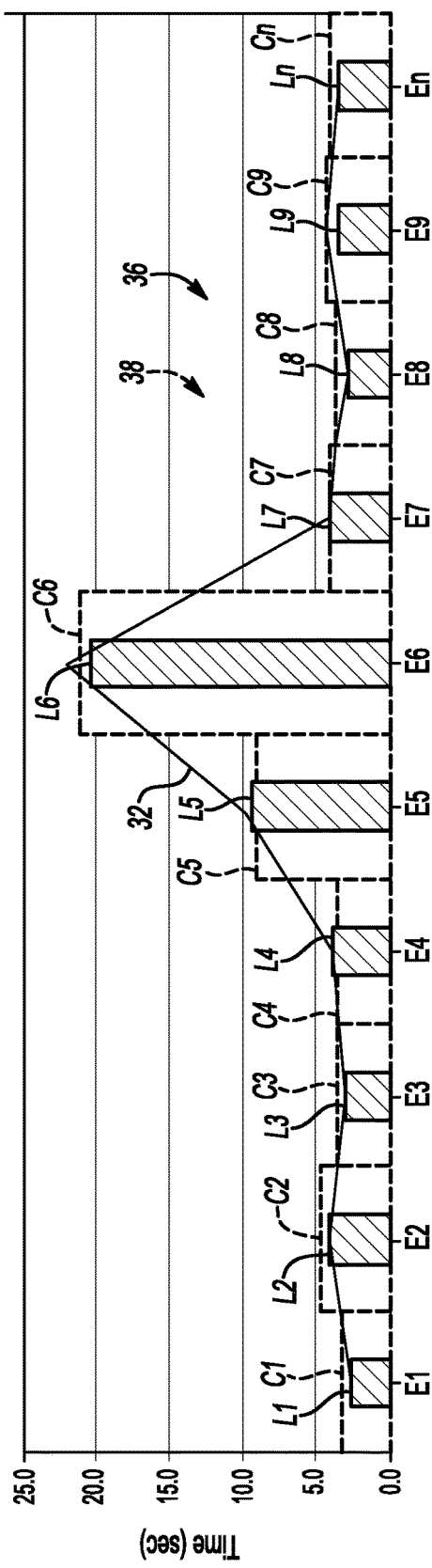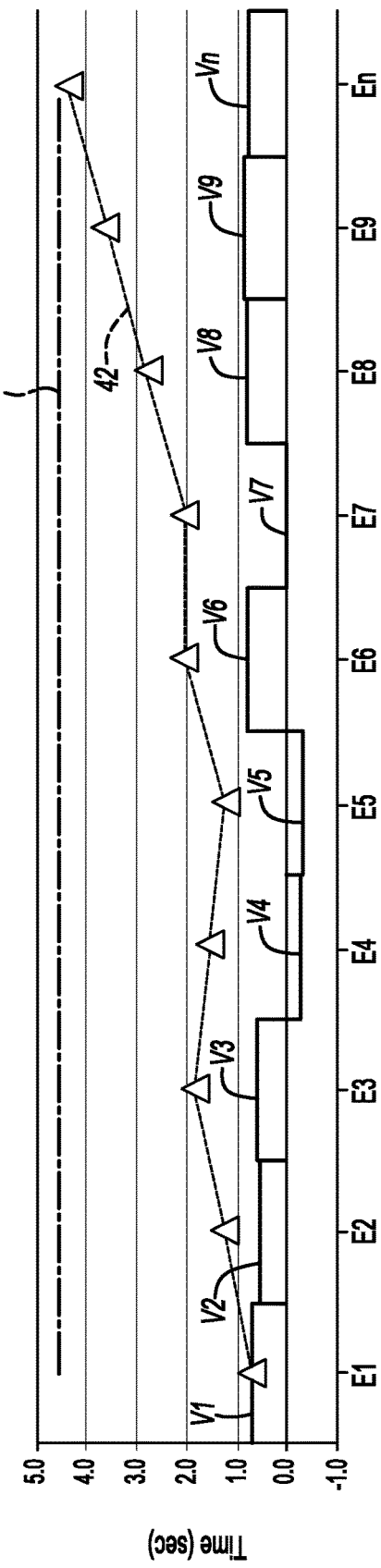
Fig-4A
Fig-4B

METHOD FOR GENERATING A MACHINE HEARTBEAT

CROSS REFERENCES TO RELATED APPLICATIONS

This application claims the benefit of U.S. Non-Provisional patent application Ser. No. 14/509,423 filed Oct. 8, 2014, which is a continuation of U.S. Pat. No. 8,880,442 issued Nov. 4, 2014, which claims priority to U.S. Provisional Application 61/493,412 filed Jun. 3, 2011, which are hereby incorporated by reference in their entirety.

TECHNICAL FIELD

The present disclosure relates generally to process control methods, and more particularly to a method and a system for generating a heartbeat of a process.

BACKGROUND

Most machinery operates by performing a predetermined set of events, which may also be referred to as tasks, in an ordered sequence to provide a process outcome. These events are precisely sequenced and timed according to the design intent of the process being performed by the machinery. These timed events may be initiated, controlled, monitored and/or measured by one or more computational devices, which may include controllers such as programmable logic controllers and/or programmable automation controllers, or the like.

As the process is performed, the duration of a timed event may vary from one process cycle to another as the process conditions change, which may vary the duration of the process cycle, the throughput and/or efficiency of the machinery, and/or the process outcome. Variation in the duration of a timed event may indicate a process condition trending toward a downtime condition, such as a tool or equipment failure, a process condition requiring maintenance to prevent productivity loss, a potential quality issue, or other condition affecting the process outcome. Known predictive methods of monitoring machinery and/or automated processes, such as machinery vibration analysis, may not sufficiently discriminate sources of variation to effectively predict process conditions which may require intervention to prevent downtime, productivity loss, or quality issues.

SUMMARY

A system and method are provided for generating a machine "heartbeat," where the heartbeat is defined by event durations of a plurality of timed events of a process performed by the machinery, where the event durations are ordered in the process event sequence. The heartbeat may be represented by a data sequence or graphically by a pattern. In one example, the pattern may be a bar graph pattern. In another example, the pattern may be a continuous line defined by the ordered event durations, where the "ordered event durations" are the event durations of the timed events of the process arranged in process sequence, e.g., in the order the timed events are performed by the process. The machine heartbeat may be used to measure, monitor and/or control the process by providing a comparator for evaluation of variation in event duration from one process cycle to another. Detailed understanding of variation in the event duration of the timed events from one process cycle to another process cycle performed by the machinery may be used to control and/or improve the process outcome and/or machinery capability, provide predictive or preventive identification of concerns through event duration analysis, enable causal analysis to identify causes of beneficial variation in event duration and/or eliminate or minimize causes of detrimental variation in event duration, and/or identify and/or initiate preventive interventions such as preventive maintenance or pre-failure process shutdown. The machine heartbeat may be generated for a process including a plurality of events performed in sequence by the process machinery, wherein the machinery includes at least one machine. A method for monitoring and/or controlling a process includes generating a series of heartbeats including a current heartbeat and one or more prior heartbeats, which may include a baseline heartbeat, a learnt heartbeat, and other prior heartbeats wherein each respective heartbeat is defined by the duration of the events of a process cycle performed under an identified condition, comparing the variance between the heartbeats and/or identifying process trends based on differences in the event durations and/or duration variances between a current heartbeat and a plurality of prior heartbeats.

The method includes associating one or more process parameters with the process, where the process parameters can include one or more of an operation parameter defined by the process and an environment parameter defined by the system including the process. A process parameter is sensed by a parameter sensor, which may be one of a process sensor and a system sensor, in real time with the performance of the process cycle, and is generated by a server in communication with the parameter sensor and the process. The server generates the process parameter using a parameter signal received from the parameter sensor, and associates the process parameter with the corresponding heartbeat. The parameter signal can be an analog signal. The process parameter can be a time dependent parameter or a time independent parameter. The method can further include generating a message based on the heartbeat and/or the process parameters and/or initiating a control action such as modifying, maintaining, or shutting down the process based on the heartbeat and/or the process parameters.

The method for generating a heartbeat of a process including at least one machine configured to perform a process cycle, wherein the process cycle consists of a plurality of timed events performed in a process sequence, includes identifying a baseline duration of each of the plurality of timed events, ordering the baseline durations of the plurality of timed events in the process sequence, and generating a baseline heartbeat defined by the ordered baseline durations of a baseline process cycle. The baseline heartbeat can correspond to the design intent condition of the process, such that baseline duration of each of the timed events is the design intent duration of that timed invent identified for the process.

The method can further include generating a learnt heartbeat defined by the ordered learnt durations of a learnt process cycle, where the learnt process cycle is performed under a known condition or set of conditions, which may include a known process parameter. In one example, the known set of conditions of the learnt process cycle corresponds to machinery and process parameters which most closely replicate the design intent of the process. In another example, the learnt cycle is a known "good cycle" where the process outcome and/or process parameters are known to be within acceptable limits. A learnt event variance can be determined between the learnt duration and the baseline duration of each respective event in the process sequence, and may be used to generate a cumulative learnt variance. The learnt event variance and/or cumulative learnt variance can be used to establish acceptable limits for the process, against which a current heartbeat of the process can be evaluated, wherein the current heartbeat is defined by a current process cycle performed under a then current process condition, allowing real time monitoring, control and preventive or predictive analysis of the process and/or machinery.

The method can include comparing the process parameter to a parameter limit to determine conformance of the process parameter to the parameter limit and/or variance of the process parameter from the parameter limit. The parameter limit may be time dependent or time independent.

The system and method can include generating a message in response to the heartbeat, the process parameter, and/or a combination thereof, which can be provided to or displayed by a user interface or transmitted to a messaging device or to the machinery, for example, as an instruction, alert or shutdown signal. The system can include a user interface configured to display one or more heartbeats and/or related data including one or more process parameters, messages and signals, where a heartbeat can be displayed as one or more of a data table, a heartbeat data sequence, a bar graph pattern, and a continuous line pattern, and a process parameter can be displayed graphically in one or more formats including as a line pattern, a data table, and a bar graph pattern.

The above features and advantages, and other features and advantages, of the present disclosure are readily apparent from the following detailed description of some of the best modes and other particular, embodiments for carrying out the invention, as defined in the appended claims, when taken in connection with the accompanying drawings.

BRIEF DESCRIPTION OF THE DRAWINGS

FIG. 4A is a schematic illustration comparing the baseline heartbeat of FIG. 3D to a learnt heartbeat and a current heartbeat;

FIG. 4B is a schematic illustration of event variance and cumulative variance between the learnt and current heartbeats of FIG. 4A;

DETAILED DESCRIPTION

Figure 1:
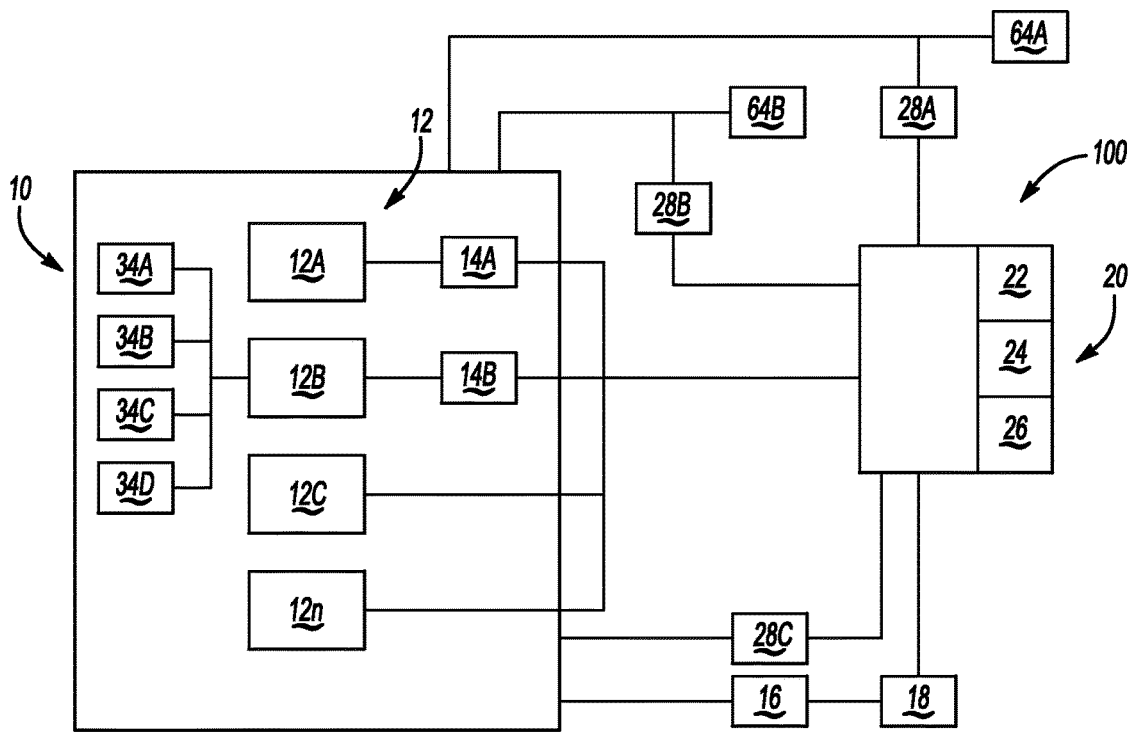
FIG. 1 is a schematic illustration of a system for generating the heartbeat of a process performed by at least one machine.

Referring to the drawings, wherein like reference numbers correspond to like or similar components throughout the several figures, FIG. 1 shows a system, generally indicated at 100, for generating a "heartbeat" of a process, where the heartbeat is defined by event durations of a plurality of timed events of a process performed by the machinery, where the event durations are ordered in the process event sequence. The heartbeat may be represented by a data sequence or graphically by a pattern. In one example, the pattern may be a bar graph pattern. In another example, the pattern can be a continuous line defined by the ordered event durations, where the "ordered event durations" are the event durations of the timed events of the process arranged in process sequence, e.g., in the order the timed events are performed by the process. The machine heartbeat can be used to measure, monitor and/or control the process by providing a comparator for evaluation of variation in event duration from one process cycle to another. Detailed understanding of variation in the event duration of the timed events from one process cycle to another process cycle performed by the machinery can be used to control and/or improve the process outcome and/or machinery capability, provide predictive or preventive identification of concerns through event duration analysis, enable causal analysis to identify causes of beneficial variation in event duration and/or eliminate or minimize causes of detrimental variation in event duration, and/or identify and/or initiate preventive interventions such as preventive maintenance or pre-failure process shutdown.

The system and method described herein includes sensing and associating one or more process parameters with the process and the process heartbeat, where the process parameters can include one or more of an operation parameter defined by the process and an environment parameter defined by the system including the process. A process parameter is sensed by a parameter sensor, which may be one of a process sensor and a system sensor, in real time with the performance of the process cycle, and is generated by a server in communication with the parameter sensor and the process. The server generates the process parameter using a parameter signal received from the parameter sensor, and associates the process parameter with the corresponding heartbeat in real time. The parameter signal can be an analog signal. The process parameter can be a time dependent parameter or a time independent parameter. As used herein, a time dependent parameter is one which requires the process 10, or an operation 66 of the process 10, to reach a preset value in a set time. For example, in a cutting operation, the depth of the cut may be a time dependent parameter such that a cut having a depth of 0.3 inches must be completed in four (4) seconds. In another example, a robot arm in a process 10 may be required to move an object 22 feet in 7.5 seconds, where the distance moved is the time dependent parameter. As used herein a time independent parameter is a process parameter which does not have time constraints, but rather is monitored and/or controlled within a certain range or to a parameter limit 74. For example, a time independent parameter is the ambient humidity in a painting operation, where the ambient humidity is controlled below a maximum allowable limit. Detailed understanding of variation in one or more of the process parameters corresponding to the heartbeat, and/or understanding of the interactions and/or patterns of the heartbeat and the process parameters in combination, can be used to control and/or improve the process outcome and/or machinery capability, provide predictive or preventive identification of process concerns, enable causal analysis to identify causes of beneficial variation in event duration and/or eliminate or minimize causes of detrimental variation in process parameters, and/or identify and/or initiate preventive interventions such as preventive maintenance or pre-failure process shutdown.

Figure 2:
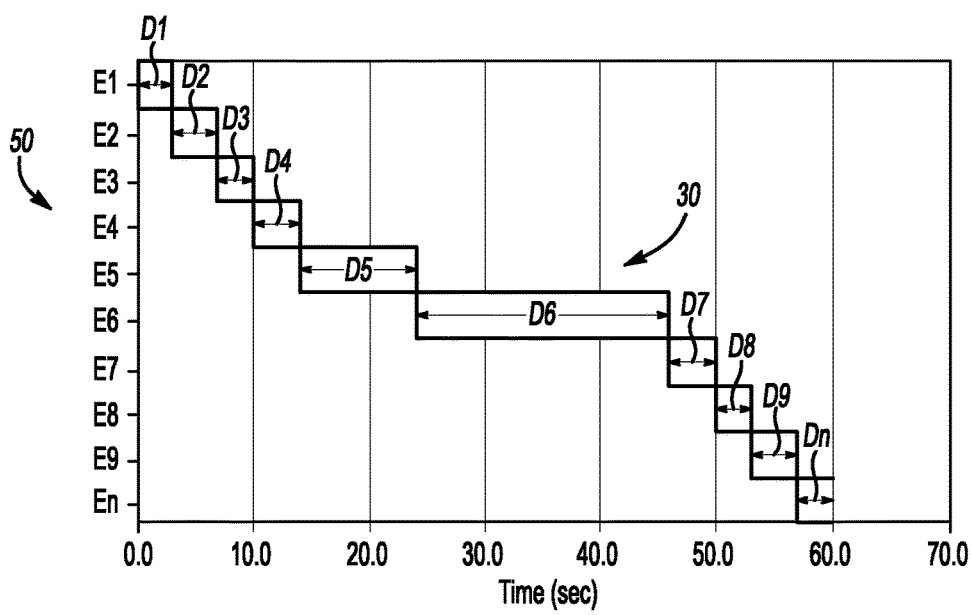
FIG. 2 is a schematic illustration of a sequence of events chart showing a process cycle including a plurality of timed events in sequenced order and a baseline duration of each of the timed events.

The process, generally indicated at 10, includes machinery generally indicated at 12 configured to perform a process cycle 30 illustrated by the sequence of events chart shown in FIG. 2. The process cycle 30 consists of a plurality of timed events E1 . . . En, performed in a process sequence 50 beginning with a first event or task E1 and ending with a last event or task En. As used herein, a timed event E refers generally to at least one of the timed events E1 . . . En. Each of the timed events E1 . . . En is characterized by an event duration, e.g., the length of time to perform the event, which may vary based on the operating condition of the process 10 and/or machinery 12. For example, referring to FIG. 2, timed event E1 has a duration D1, timed event E2 has a duration D2, and so on. As shown in FIG. 1, in a non-limiting example, the machinery 12 includes at least one machine, which may be one or more of the machines 12A, 12B, 12C . . . 12n, configured to perform the process 10. The machinery 12 may include a controller, which may be one or more of the controllers 14A, 14B, in communication with at least one of the machines 12A . . . 12n. The controller 14A, 14B may be configured as a programmable logic controller (PLC), a programmable automation controller (PAC), or the like. Each of the machines 12A . . . 12n and/or the machinery may be of any type configurable to perform at least one "timed event" in a sequence of events defining a process cycle of the process 10, where a "timed event" as that term is used herein is an event having a defined start and stop such that the duration of the event is measurable or otherwise determinable. One or more of the timed events E1 . . . En may be grouped to define an operation 66 (see FIG. 7), such that the process 10 may include one or more operations 66 performed by the machinery 12. An operation 66 can include a combination of one or more events E1 . . . En which may be performed by one or more machines 12, and which may be performed sequentially and/or concurrently with other operations 66 defined by the process 10. The machinery 12 may be controlled by a controller, may be automated, or may otherwise be operated in a manner such that the duration of the timed event performed during a process cycle is determinable.

The process 10 includes at least one process sensor 34 configured to sense, measure, or otherwise indicate or quantify a process operation parameter 70 (see FIG. 8) of the process 10. A "process operation parameter," as that term is used herein, is a parameter, such as a characteristic, feature, behavior, condition, or other factor of the process 10, which defines an operating condition of the process 10. An operating condition of the process 10 can include, by way of non-limiting example, an operating condition of an operation 66, a timed event E, an event group, and/or a machine 12 of the process 10. A process operation parameter 70 is also referred to herein as an operation parameter. Each process sensor 34 is in communication with at least one controller 14 and/or a server 20 to output operation signal data corresponding to the operation parameter 70 sensed by that process sensor 34 to the controller 14 and/or server 20, such that the operation parameter 70 can be determined by the controller 14 and/or server 20 using the operation signal data received from the process sensor 34 during performance of a process cycle 30. In a non-limiting example shown in FIG. 1, the process 10 includes a plurality of process sensors 34 including process sensors 34A, 34B, 34C, 34D configured to sense, respectively, a plurality of operation parameters 70A, 70B, 70C, 70D (see FIG. 8) of an operation 66 performed by machine 12B. The process sensors 34A, 34B, 34C, 34D are in communication with the controller 14B and/or the server 20 such that operation signal data output by the process sensors 34A, 34B, 34C, 34D can be received and processed by at least one of the controller 14B and server 20 to generate the operation parameters 70A, 70B, 70C, 70D for the operation 66. The operation signal which is output from the process sensor 34 can be one of an analog signal and a digital signal. In an illustrative example, the operation signal output from the process sensor 34 is an analog signal of an operation parameter 70, where the operation parameter 70 can be one of a time dependent parameter and a time independent parameter, as further described herein. The example is not intended to be limiting, for example, an operation parameter 70 can be specific to a single event E in the process cycle 30. In another example, an operation parameter 70 can be specific to a single group of events E in the process cycle 30.

The process 10 includes at least one system sensor 28 configured to sense, measure, or otherwise indicate or quantify a process environment parameter 72 (see FIG. 13) of the system 100 including the process 10. A "process environment parameter," as that term is used herein, is a parameter, such as a characteristic, feature, behavior, condition, or other factor of the system 100, which defines an environment condition of the system 100 and the process 10. A process environment parameter 72 is also referred to herein as an environment parameter 72. Each system sensor 28 is in communication with at least one controller 14 and/or a server 20 to output environment signal data corresponding to the environment parameter 72 sensed by that system sensor 28 to the controller 14 and/or server 20, such that the environment parameter 72 can be determined by the controller 14 and/or server 20 using the environment signal data received from the system sensor 28. In a non-limiting example shown in FIG. 1, the system 100 includes a plurality of system sensors 28 including system sensors 28A, 28B, 28C configured to sense a plurality of operation parameters 72 including environment parameters 72A, 72B (see FIG. 13) of system 100 during performance of a process cycle 30. In the example shown in FIG. 1, system sensors 28A, 28B are configured to sense, respectively, environment parameters 72 of system elements 64A, 64B. In the example shown in FIG. 1, system sensor 28C is configured to sense an environment parameter 72 such as ambient temperature within the system 100, for example, within a facility which houses the system 100 and/or the ambient temperature in the immediate vicinity of the process 10. In the example shown, the system sensors 28A, 28b, 28C are in communication with server 20 such that environment signal data output by the system sensors 29A, 28B, 28C can be received and processed by the server 20 to generate the environment parameters 72 including environment parameters 72A, 72B shown in FIG. 13 for the operation 66. The environment signal which is output from the system sensor 28 can be one of an analog signal and a digital signal. In an illustrative example, the environment signal which is outputted from the system sensor 28 is an analog signal of an environment parameter 72.

Process operation parameters 70 and process environment parameters 72 may be referred to collectively herein as process parameters 70, 72, and/or individually as a process parameter 70, 72 when referring to a process parameter which may be one of an operation parameter 70 or an environment parameter 72. Process sensors 34 and system sensors 28 may be referred to collectively herein as parameter sensors 28, 34, and/or individually as a parameter sensor 28, 34 when referring to a parameter sensor which may be one of a process sensor 34 and a system sensor 28. An output from a parameter sensor 28, 34 may be referred to herein as a sensor signal and/or as sensor signal data. Operation signals and environmental signals may be referred to collectively herein as process parameter signals or as parameter signals when referring to a parameter signals which may include operation signals, environment signals or a combination of operation and environment signals, and/or may be referred to individually as a process parameter signal or parameter signal data which may be either environmental signal data or operation signal data.

The system 100 includes at least one server 20 in communication with the machinery 12, the controllers 14, the system sensors 28 and the process sensors 34. The server 20 is configured to receive event duration data from the machinery 12, operation signal data from the process sensors 34, and environment signal data from the system sensors 28. The server 20 uses the received data to generate a heartbeat for the process 10 including the machinery 12 using the event duration data. The server 20 uses the process parameter signals received from the parameter sensors 28, 34 to generate the process parameters 70, 72. For example, the server 20 uses the operation signal data received from the process sensors 34 to generate operation parameters 70, and uses the environment signal data received from the system sensors 28 to generate environment parameters 72, and associates the operation and environment parameters 70, 72 corresponding to the heartbeat with that heartbeat. The server 20 may include one or more applications 22 adaptable to process the event duration data received from the machinery 12, to process the operation signal data received from the process sensors 34, and to process the environment signal data received from the system sensors 28. The server 20 may include a memory 24 and a database 26 for receiving, storing, and/or providing the event duration data, operation signal data, environment signal data, and data derived therefrom including variance and trend data, heartbeat data, heartbeat history, operation parameter data, operation parameter data history, environment parameter data, environment parameter history, parameter variance data, parameter conformance data, etc. within the system 100, and a central processing unit (CPU) (not shown) for executing the applications 22. The memory 24, at least some of which is tangible and non-transitory, may include, by way of example, ROM, RAM, EEPROM, etc., of a size and speed sufficient, for example, for executing the applications 22, storing the database 26, and/or communicating with the machinery 12, controllers 14A, 14B, parameter sensors 28, 34, system elements 64, and/or devices 16, 18.

Processing the event duration data using the applications 22 can include, by non-limiting example, one or more of generating a heartbeat based on the event duration data; associating the event duration data and/or heartbeat with the time the event duration data was provided; associating the event duration data and/or heartbeat with a process parameter, such as an operation parameter 70 of the machinery 12 and/or process 10 and/or an environment parameter 72 of the system 100 at the time the event duration data was provided; associating the event duration data with a particular machine 12A ... 12n of the machinery 12, a particular event E1 ... En, a machine condition, a time of the event or other event identifying information, associating a process parameter 70, 72 with a specific event E or a group of events, etc. The applications 22 can include, by non-limiting example, analyzing the event duration data to generate a heartbeat, an event variance, and/or a cumulative variance; analyzing the event duration data and/or data derived therefrom to identify process trends, abnormalities or other data patterns; storing the event duration data, the process parameter data, and other data derived therefrom, including but not limited to an event variance, a cumulative variance, a heartbeat, trend data, a process parameter, a parameter variance, parameter conformance, etc., with associated information such as event identifying information, parameter identifying information including parameter sensor information, parameter limits 74, etc. in a database 26; generating a message or signal based on the event duration data, the process parameter data, and/or a combination thereof; and/or transmitting the message or signal to the machinery 12 via the controllers 14A, 14B or directly, to a user interface device 18, or to another messaging device 16 which may be in communication with the machinery 12, process 10 of system 100.

The applications 22 can include, by non-limiting example, analyzing the parameter signals and/or parameter signal data generated by the parameter sensors 28, 34 to generate a process parameter 70, 72, comparing the parameter signal, parameter signal data and/or the process parameter 70, 72 to one or more parameter limits 74 to identify conformance and/or non-conformance to the parameter limits 74 and/or variance from the parameter limits 74; analyzing the process parameters 70, 72 and/or data derived therefrom to identify trends, abnormalities or other data patterns related to the process parameters 70, 72; storing the parameter signal data and other data derived therefrom, including but not limited to a parameter variance from a parameter limit 74, trend data, with associated information such as identifying information associated with the process parameter 70, 72, etc. in a database 26; generating a message or signal based on the process parameter 70, 72; and/or transmitting the message or signal to the machinery 12 via the controllers 14A, 14B, to the system elements 64 via the server 20, and/or directly, to a user interface device 18, or to another messaging device 16 which may be in communication with the machinery 12, process 10, system elements 64, controllers 14A, 14B, and/or system 100.

The applications 22 can include, by non-limiting example, controlling a system element 64 in response to an environment parameter 72, e.g., in response to the environment signal received from a system sensor 28 sensing the system element 64, where controlling the system element 64 can include controlling the environment parameter 72 at a known value or within a known range, and/or comparing the environment parameter 72 generated by the server 20 from the environment signal to at least one parameter limit 74, and controlling the system element 64 to operate such that the environment parameter 72 is controlled in conformance with the at least one parameter limit 74. The applications 22 can include, by non-limiting example, controlling an event E, a process 10 and/or machine 12 in response to an operation parameter 70, e.g., in response to the operation signal received from a process sensor 34 sensing the event E, the machine 12 and/or the process 10, where controlling the event E, the machine 12 and/or the process 10 can include controlling the operation parameter 70 at a known value or within a known range, and/or comparing the operation parameter 70 generated by the controller 12 and/or server 20 from the operation signal to at least one parameter limit 74 and controlling the machine 12 and/or process 10 to operate such that the operation parameter 70 is controlled in conformance with the at least one parameter limit 74.

Figure 12:
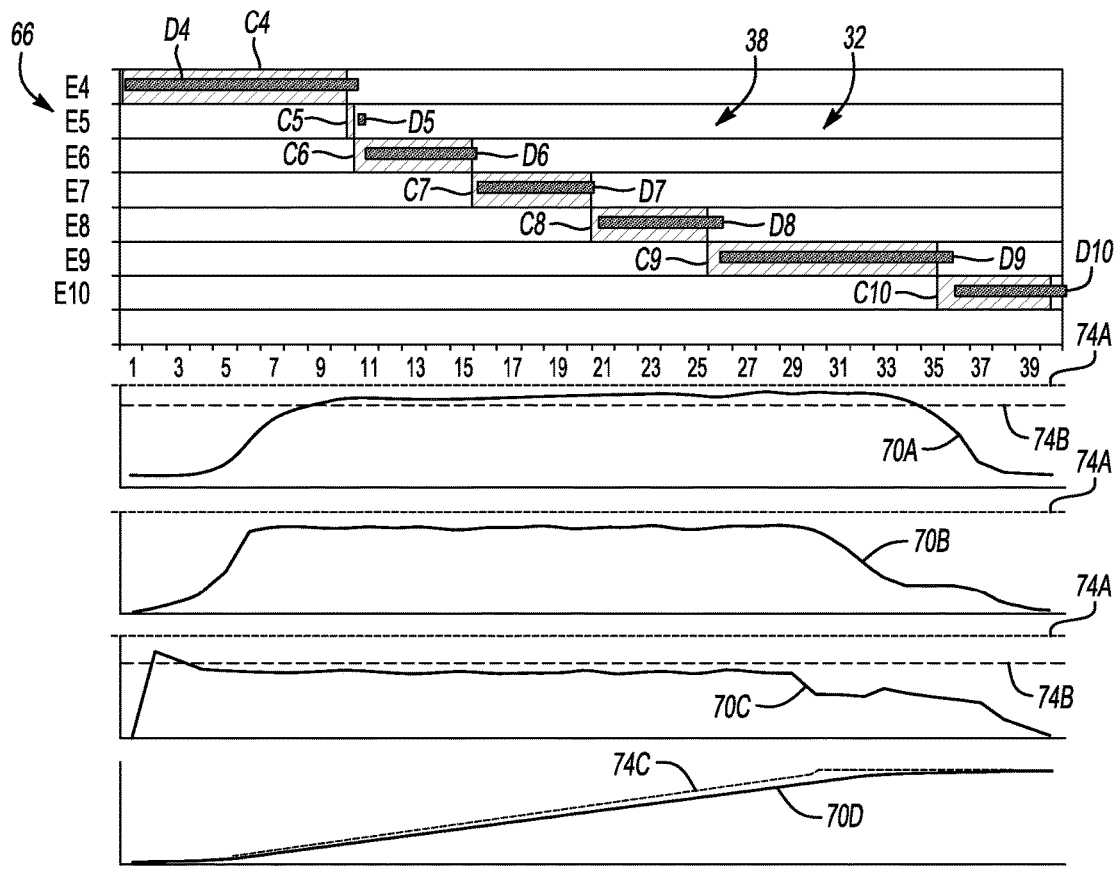
FIG. 12 is a schematic illustration of another example composite view of the operation parameters and the heartbeat of the process operation.

In the illustrative examples, whether a process parameter 70, 72 is "in conformance with" the at least one parameter limit 74 is determined by the type and/or configuration of the at least one parameter limit 74. By way of example and referring to FIG. 12, shown are operation parameters 70A, 70B, 70C and 70D, each having at least one respective parameter limit 74. Operation parameter 70A is shown having parameter limits 74A, 74B, where the parameter limit 74A is a minimum limit and the parameter limit 74B is a maximum limit of the operation parameter 70A. In this example, the operation parameter 70 A is in conformance with the parameter limits 74A and 74B when the operation parameter 70A above the minimum parameter limit 74B and below the maximum parameter limit 74A. In another example, operation parameter 70B is shown having a maximum parameter limits 74A, where the operation parameter 70B is in conformance with the parameter limit 74A when the operation parameter 70B is below the maximum limit 74A. In another example, operation parameter 70C is shown having parameter limits 74A, 74B, where the parameter limit 74A is a maximum limit and the parameter limit 74B is a preferred limit, such that the operation parameter 70C is in conformance with the parameter limit 74A and 74B when the operation parameter 70C is below the maximum limit 74A, and such that sensing the operation parameter 70C above the preferred limit 74B may actuate the controller 12 and/or the server 20 to send a message or alert that the preferred limit 74B has been exceeded, and/or that an adjustment of the process 10 and/or a machine 12 is required to control the operation parameter 70C below the preferred limit 74B.

In another example, operation parameter 70D is shown having a parameter limit 74C which is time dependent, e.g., such that the value of the parameter limit 74C varies during the duration of the event E, operation 66 and/or process cycle 30 characterized by the operation parameter 70D. In the example shown in FIG. 12, the parameter limit 74C represents a baseline value of the operation parameter 70D, such that the operation parameter 70D is not in conformance with the baseline value of the parameter limit 74C at any time that the operation parameter 70D and the parameter limit 74C differ in value, and such that for any time during the performance of the event E, operation 66 and/or process cycle 30 characterized by the operation parameter 70D, a variance between the operation parameter 70D and parameter limit 74C can be determined by the controller 12 and/or the server 20 and used to analyze the performance of the event E, process 10 and/or machine 12 and/or the conditions generating the operation parameter 70D. The baseline value represented by the parameter limit 74C can be, by way of illustrative example, determined from a design intent value of the operation parameter 70D and/or from a learnt process cycle, such that the parameter limit 74C defines a known condition.

The examples provided herein are non-limiting. For example, it would be understood that the functions of the server 20 may be provided by a single server, or may be distributed among multiple servers, including third party servers, and that the data within the system 100 may be provided by databases configured other than as described for the database 26. For example, the event duration data and/or process parameters 70 related to machine 12A may reside in a shared database stored in the controller 14A in communication with the server 20. The database 26 may be distributed among multiple servers, including third party servers, in communication with each other and the server 20 through a network (not shown), such as the Internet, and/or directly.

Figure 3A:
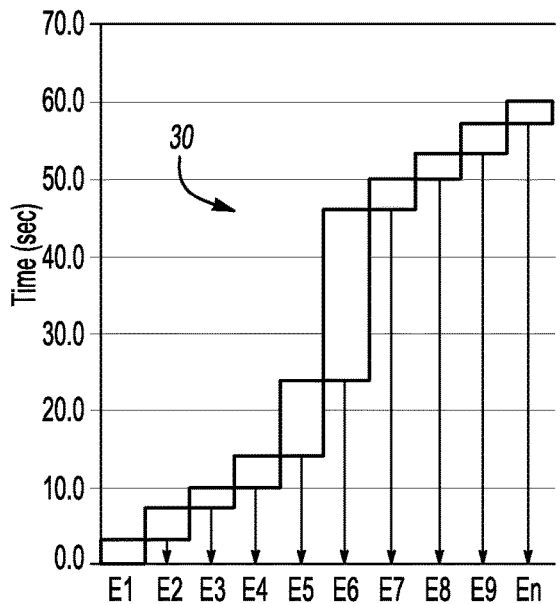
FIG. 3A is a schematic illustration of rotating the sequence of events chart of FIG. 2 and shifting each of the plurality of baseline event durations to originate at the horizontal axis to order the baseline event durations in process sequence order to form the bar graph shown in FIG. 3B.
Figure 3B:
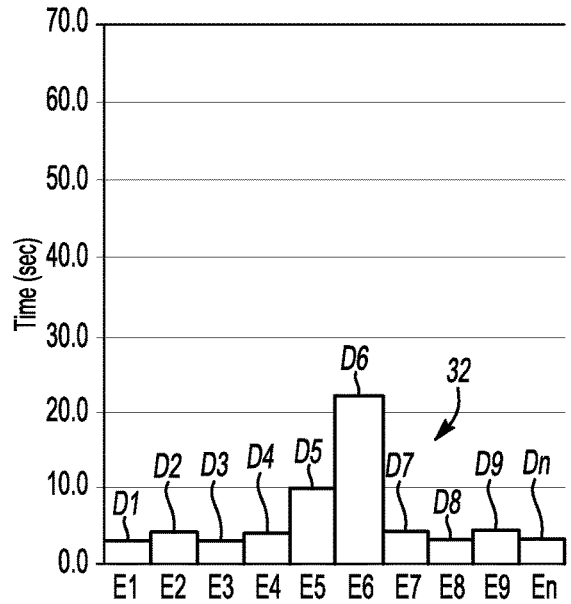
FIG. 3B is a schematic illustration of a baseline heartbeat of the process cycle of FIG. 2 defined by the ordered baseline event durations, ordered as illustrated in FIG. 3A, where the pattern of the baseline heartbeat is graphically represented by the pattern of the bar graph formed by the ordered baseline event durations.
Figure 3C:
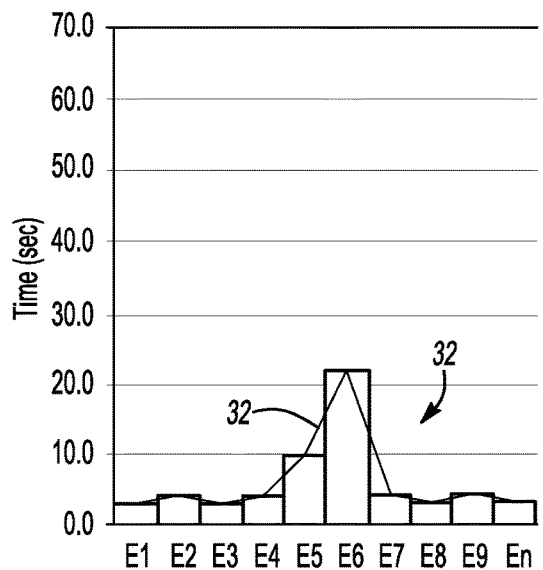
FIG. 3C is a schematic illustration showing the baseline heartbeat of the process cycle of FIG. 2, where the pattern of the baseline heartbeat is graphically represented by the pattern of the bar graph of FIG. 3B and by the pattern of a continuous line connecting the ordered baseline event durations.
Figure 3D:
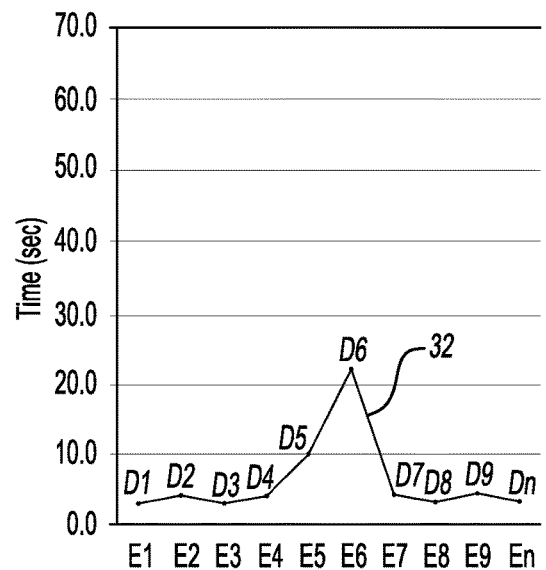
FIG. 3D is a schematic illustration of the baseline heartbeat of the process cycle of FIG. 2 where the pattern of the baseline heartbeat is graphically represented by the pattern of the continuous line connecting the ordered baseline event durations.

FIGS. 2 through 3D illustrate a method for generating a machine heartbeat, which may be, in the example shown, a baseline heartbeat 32 (see FIG. 3D), defined by event duration data D1 . . . Dn provided for the sequential timed events E1 . . . En of a process cycle 30 (see FIG. 2) to be performed by the machinery 12. In the example shown, the baseline heartbeat 32 and the baseline event duration data D1 . . . Dn corresponds to the design intent of the process cycle 30.

As illustrated by the sequence of events chart shown in FIG. 2, performing a single process cycle 30 of the process 10 consists of performing the first timed event E1, then performing the second timed event E2, and so on, until each of the plurality of timed events E1 . . . En are performed in the process sequence 50 indicated by the ordering of events E1 . . . E2 shown on the sequence of events chart to complete the process cycle 30. Each timed event E1 . . . En in the baseline process cycle 30 is characterized by a baseline event duration D1 . . . Dn, which in the example shown is the length of time to perform the event as specified by the design intent of the process 10. In a non-limiting example, where the values indicated are for illustrative purposes, each respective baseline duration D1 . . . Dn corresponding to a respective timed event E1 . . . En is shown graphically in FIG. 2 and in the data table identified as Table 1.

TABLE 1

| Event (E) | E1 | E2 | E3 | E4 | E5 | E6 | E7 | E8 | E9 | En |
|---|---|---|---|---|---|---|---|---|---|---|
| Baseline Duration (D) | 3.0 | 4.0 | 3.0 | 4.0 | 10.0 | 22.0 | 4.0 | 3.0 | 4.0 | 3.0 |

A heartbeat of the process 10 may be defined by the event durations of a process cycle performed under an identified condition, where the event durations of the identified process cycle are ordered in the process sequence 50, to provide "ordered baseline durations" of the identified process cycle. As referred to herein, the "ordered event durations" are the event durations of an identified process cycle arranged in the order of the process sequence 50 to define the heartbeat of the identified process cycle, and an "identified condition" is the condition under which the process cycle is performed to provide the event duration data from which a respective heartbeat is generated. For example, referring to the baseline process cycle 30 shown in FIG. 2, the identified condition of the baseline process cycle 30 is a baseline condition, which may be the design intent condition of the process 10 and/or the machinery 12. A baseline heartbeat 32 (shown graphically in FIGS. 3B-3D) is defined by the ordered baseline event durations shown in order of the process sequence 50 in Table 1, where the baseline heartbeat 32 may also be expressed as a baseline data sequence (D1, D2, D3, D4, D5, D6, D7, D8, D9, Dn), which, using the illustrative values shown in Table 1, corresponds to the ordered baseline event durations (3, 4, 3, 4, 10, 22, 4, 3, 4, 3). Referring now to FIGS. 3A-3B, the baseline heartbeat 32 may be graphically generated by rotating the sequence of events chart of FIG. 2 to order the plurality of timed events E1 . . . En along the horizontal axis (as shown on the page) in the process sequence 50, and by shifting each of the plurality of baseline event durations D1 . . . Dn as indicated by the arrows on FIG. 3A, such that each event duration D1 . . . Dn originates at the horizontal axis, to form the bar graph shown in FIG. 3B and corresponding to the baseline heartbeat data sequence (D1, D2 . . . Dn) defined by the ordered baseline event durations D1 . . . Dn. FIG. 3B shows the pattern formed by the bar graph, which provides a graphical representation of the baseline heartbeat 32. Other graphical representations of the baseline heartbeat 32 may be defined by the ordered baseline event durations D1 . . . Dn. For example, FIG. 3C shows the baseline heartbeat 32 graphically represented by a continuous line, where the pattern of the continuous line is defined by the ordered baseline event durations D1 . . . Dn, and corresponds to the bar graph pattern generated in FIG. 3B and shown again in FIG. 3C. FIG. 3D shows the heartbeat 32 graphically represented by the continuous line, graphically showing the rhythm of the baseline heartbeat 32 defined by the ordered baseline event durations D1 . . . Dn. It would be understood that the baseline heartbeat 32 may be expressed by the baseline heartbeat data sequence (D1,D2, . . . , Dn), graphically represented by the bar graph pattern of FIG. 3B defined by the ordered baseline event durations, or graphically represented by a continuous line pattern of FIG. 3D defined by the ordered baseline event durations, wherein either graphical representation (bar graph pattern or continuous line pattern) shall be considered equivalent to the other and to the heartbeat data sequence illustrated by Table 1 in defining the baseline heartbeat 32 of the baseline process cycle 30.

As described previously, a heartbeat of the process 20 may be defined by the ordered event durations of a process cycle performed under an identified condition, where the event durations of the identified process cycle are ordered in the process sequence 50, to provide "ordered baseline durations" of the identified process cycle. It would be understood that the actual duration of a timed event during performance of the process 10 may vary from one process cycle to another based on the operating condition and/or process parameters 70, 72 of the process 10, the machinery 12, and/or the system 100 during performance of that process cycle or a particular event E and/or operation 66 of that process cycle. Process parameters 70, 72 may include environment parameters 72 such as the ambient temperature or humidity in proximity of the process 10, one or more of hydraulic pressure, surge pump pressure, fluid temperature, etc. of a system element 64 which may be a hydraulic system used to provide hydraulic pressure and/or coolant to the process 10 and/or the machine 12, air pressure in a system element 64 which may be a pneumatic system being used to provide compressed air to the process 10 and/or the machine 12, current and voltage levels of a system element 64 which is an electrical power source supplying electrical power to the process 10 and/or the machine 12, etc. Process parameters 70, 72 may include operation parameters 72 such as tool and/or fixture operating parameters including rotation speed, torque, feed rate, travel, operating temperature, location, pressure, etc. and/or measurements of machine maintenance or wear, lubrication, tooling set-up or wear, workpiece fixturing, workpiece dimensional and/or material variation, etc. The examples of process parameters 70, 72 are non-limiting, and it would be understood that the types and examples of process parameters 70, 72 would vary with the type of system 100, process 10, and/or machine 12.

FIG. 4A shows a series of heartbeats 32, 36, 38 generated for the process 10, where each of the heartbeats 32, 36, 38 varies from another of the heartbeats 32, 36, 38 due to variability in the operating condition of the process 10, wherein each of the heartbeats 32, 36, 38 may be associated with an identified operating condition of the process 10 during the process cycle from which the heartbeat 32, 36, 38 is derived. The first heartbeat shown in FIG. 4A is the baseline heartbeat 32, which is graphically represented in FIG. 4A as a continuous line, and the baseline process cycle 30 (see FIG. 2) from which the baseline heartbeat 32 is generated corresponds to the design intent condition of the process 10. A second heartbeat is graphically represented in FIG. 4A as a bar graph formed of the cross-hatched bars defined by a second heartbeat data sequence (L1,L2,L3 . . . Ln) is generally indicated at 36. The second heartbeat 36 in the present example may also be referred to as a learnt heartbeat 36, where the learnt process cycle (not shown) from which the learnt heartbeat 36 is generated corresponds to a known condition of the process 10, and the learnt event durations L1, L2 . . . Ln correspond to the timed events E1, E2 . . . En performed in the process sequence 50 by the learnt process cycle.

The known condition of the learnt process cycle may be, for example, a process cycle representing optimized process and machine conditions, e.g., conditions most closely replicating design intent process cycle 30. The known optimized (learnt) process cycle and learnt heartbeat 36 derived therefrom may be used, for example, to determine the best possible process performance to be expected during actual operation of the process 10, as compared with the original design intent of the process represented by the baseline heartbeat 32. By way of example, the learnt process cycle may be a known good cycle, where a "good cycle" as used herein, is a process cycle for which the process parameters 70, 72 of that process cycle are within acceptable parameter limits 74 determined for the process 10 and/or machinery 12. For example, a known good cycle may be a learnt process cycle performed within the design specification of the process 10, e.g., performed within an acceptable tolerance from the design intent process cycle 30, where the parameter limits 74 are determined by the design specification of the process 10. In another example, the known condition of the learnt process cycle may be characterized by one or more process parameters 70, 72 including for example, machine set-up parameters, key characteristics of the fixturing or other operating characteristics of the machine, environment characteristics such as operating temperatures, process outcome parameters such as finished workpiece characteristics, etc. which have been measured and recorded during performance of the learnt process cycle to establish a known set of conditions defining the learnt heartbeat 36. The known set of conditions can be used, in one example, to define learnt parameter limits 74 for a process parameter 70, 72, such that the process parameter 70, 72 can be controlled within the learnt parameter limits 74 during performance of a learnt process cycle to a known value or within a known range.

The learnt process cycle may be performed by the process 10 after determining the baseline process cycle 30 from the design intent of the process 10, such that the learnt process cycle is considered to be performed subsequent to the baseline process cycle 30, and the learnt heartbeat 36 is a subsequent heartbeat of the process 10 relative to the prior baseline heartbeat 32. By comparing a subsequent heartbeat generated for a subsequent identified condition to a prior heartbeat generated for a prior condition, where subsequent and prior refer to the relative time at which the respective identified process cycle was performed from which each respective heartbeat is generated, the performance of the process 10 and/or the machinery 12 may be monitored, evaluated and/or controlled.

Comparing a subsequent heartbeat to a prior heartbeat may include, for example, determining a variance between the event duration of an event during the subsequent process cycle from which the subsequent heartbeat is derived, and the event duration of the same event during a prior process cycle from which the prior heartbeat is derived. For example, the learnt event duration L1 of the timed event E1 measured during the learnt process cycle performed by the machinery 12 may be compared with the baseline event duration D1 of the timed event E1 determined from the design intent process cycle specified for the machinery 12. The variance between the learnt event duration L1 and the baseline event duration D1 may be referred to as the learnt event variance for the timed event E1, where the learnt event variance may be used to establish the expected variance of the duration of the timed event E1 from the baseline (design intent) duration of the timed event E1 during process operation. Similarly, the variance between learnt event duration L2 and the baseline event duration D2 may be determined for the second timed event E2 in the event sequence of the process 10, and so on, such that the variance between each of the learnt events durations L1 . . . Ln and the respective baseline event durations D1 . . . Dn may be determined for each of the timed events E1 . . . En in the process sequence 50 of the process 10. The learnt event variances for the timed events E1 . . . En can then be used, for example, to provide an expected event variance for comparison with subsequent process cycles. A tolerance or limit for subsequent event variances may be established for each of the learnt event variances for the timed events E1 . . . En, which may be used in evaluating subsequent event durations, where variance of a subsequent event duration is in excess of the learnt event variance and/or a tolerance or limit established for the learnt event variance may cause the system 100 to generate a message, which may be, for example, an indication that the event corresponding to the excess event duration be further monitored or evaluated, an indication that maintenance of the machinery 12 performing the event is indicated or required, an indication that the cycle time of the process 10 may be changing in a manner which may impact a process outcome including for example, process productivity, quality or uptime, a signal to the process 10 and/or machinery 12 to modify operating conditions which may include shutting down an operation to prevent an undesirable change in process outcome, which may include shutting down an operation to prevent damage to or failure of the machinery 12 and/or related downtime, or triggering an alarm or alert.

Comparing a subsequent heartbeat to a prior heartbeat may include, in another example, determining the cumulative variance between a subsequent heartbeat defined by a subsequent process cycle, and a prior heartbeat defined by a prior process cycle. Referring again to FIGS. 4A and 4B, a learnt cumulative variance between the learnt heartbeat 36 and the baseline heartbeat 32, where the learnt heartbeat 36 is a subsequent heartbeat relative to the prior baseline heartbeat 32, may be determined by summing the learnt event variances of the timed events E1 . . . En to determine a learnt cumulative variance for the duration of the learnt process cycle relative to duration of the baseline process cycle. The learnt cumulative variance, which corresponds to line 40 in the example of FIG. 4B, can then be used, for example, to provide an expected cumulative variance for a subsequent heartbeat, such as a current heartbeat 38 shown in FIG. 4A, relative to the baseline heartbeat 32, where the expected cumulative variance corresponds to the expected variance of the total duration of the subsequent process cycle relative to the total duration of the baseline process cycle 30. The learnt cumulative variance 40 may be established as a limit 40, as shown in FIG. 4B, for comparison with or evaluation of a subsequent cumulative variance defined by a subsequent heartbeat corresponding to a subsequent process cycle. The system 100 may be configured such that when a subsequent cumulative variance of a subsequent event duration is in excess of the learnt event variance and/or limit 40, the system 100 may generate a message, which may be, for example, an indication that the machinery 12 and/or process 10 be further monitored or evaluated, an indication that maintenance of the machinery 12 is indicated or required, an indication that the cycle time of the process 10 may be changing in a manner which may impact a process outcome including for example, process productivity, quality or uptime, a signal to the process 10 and/or machinery 12 to modify operating conditions which may include shutting down an operation to prevent an undesirable change in process outcome or to prevent a damage to or failure of the machinery 12 and/or related downtime, or triggering an alarm or alert.

Referring again to FIG. 4A, a third heartbeat is generally indicated at 38 and is graphically represented in FIG. 4A as a bar graph formed of the broken-line bars defined by a third heartbeat data sequence (C1,C2,C3 . . . Cn). The third heartbeat 38 in the present example may also be referred to as a current heartbeat 38, where the current process cycle (not shown) from which the current heartbeat 38 is generated corresponds to a current condition of the process 10, and the learnt event durations C1, C2 . . . Cn correspond to the timed events E1, E2 . . . En performed in the process sequence 50 by the current process cycle. The current process cycle may be performed by the process 10 after the learnt process cycle and the baseline process cycle 30, such that the current process cycle is considered to be performed subsequent to the learnt and baseline process cycles, and the current heartbeat 38 is a subsequent heartbeat of the process 10 relative to the learnt heartbeat 36 and relative to the baseline heartbeat 32, where the learnt and baseline heartbeats 36, 32 may be referred to as prior heartbeats of the process 10 relative to the current heartbeat 38.

The current process cycle is performed under a current condition, e.g., the actual operating condition of the process 10 and/or machinery 12 existing at the time the current process cycle is performed. As such the current condition includes and/or reflects changes in process operating parameters of the process 10, machine operating parameters of the machinery 12, workpiece characteristics of the workpiece (not shown) being processed by the machinery 12, or other sources of process variation, which may include, for example, variation in environmental conditions influencing process performance and/or output such as temperature, humidity, incoming power source characteristics, or the like existing at the time the current process cycle is performed. By comparing the current heartbeat 38 to at least one prior heartbeat 32, 36, the performance of the process 10 and/or the machinery 12 may be monitored, evaluated and/or controlled in real time, e.g., at the time the current process cycle defining the current heartbeat 38 is performed. Further, by comparing a subsequent heartbeat, such as the current heartbeat 38, to a plurality of prior heartbeats which may include the baseline heartbeat 32, the learnt heartbeat 36, and/or another current heartbeat generated subsequent to the learnt heartbeat 36 and prior to the current heartbeat 38, where the another current heartbeat is a prior heartbeat relative to the current heartbeat 38, process trends may be evaluated and/or identified based on the comparison of at least one of the current event variance and the current cumulative variance of the current heartbeat 38.

Comparing the current heartbeat 32 to the learnt heartbeat 36 may include, for example, determining a current event variance between the current event duration of a timed event determined during the current process cycle, and the learnt event duration of the same event determined during the learnt process cycle. For example, and referring to FIGS. 4A and 4B, the current event duration C1 of the timed event E1 measured during performance of the current process cycle may be compared with the learnt event duration L1 of the timed event E1 determined from the learnt process cycle. The variance between the current event duration C1 and the learnt event duration L1 for the timed event E1 is shown in FIG. 4B as the current event variance V1, where the current event variance V1 may be used to evaluate the current process condition by comparing the current event variance V1 to the learnt event variance for the timed event E1.

Similarly, the current event variance V2 between current event duration C2 and the learnt event duration L2 may be determined for the second timed event E2 in the event sequence 50 of the process 10, and so on, such that the current event variance V1 . . . Vn between each of the current event durations C1 . . . Cn and the respective learnt event durations L1 . . . Ln may be determined for each of the timed events E1 . . . En in the process sequence 50 of the process 10. The current event variances V1 . . . Vn for the timed events E1 . . . En can be evaluated and used to monitor the current operating condition of the process 10 and/or the machinery 12, which may include generating a message using the system 100 in response to one or more of the current event variances V1 . . . Vn, and/or process trends identified by the system 100. The message may be, for example, an indication that the respective event corresponding to the current event variance V1 . . . Vn to which the message is related may required further monitoring or evaluation, an indication that maintenance of the machinery 12 performing the respective event is indicated or required, an indication that the cycle time of the process 10 may be changing in a manner which may impact a process outcome, and/or a signal to the process 10 and/or machinery 12 to modify operating conditions including process parameters 70, 72, which may include shutting down an operation, process, or system element 64 to prevent the occurrence of damage to the machinery 12 and/or to prevent the incurrence of process downtime.

Referring again to FIGS. 4A and 4B, a current cumulative variance between the current heartbeat 32 and the learnt heartbeat 36 may be determined by summing the current event variances V1 . . . Vn of the timed events E1 . . . En to generate the current cumulative variance 42 for the current process cycle relative to the learnt process cycle shown in FIG. 4B. The current cumulative variance 42 may be compared at any point in the event sequence 50 (E1, E2, . . . En) to determine whether the current cumulative variance 42 at that point in the event sequence 50 of the current process cycle has exceeded a limit. The limit may be, in the example shown in FIG. 4B, the limit 40 defined by the learnt cumulative variance. The system 100 may be configured such that when the current cumulative variance 42 exceeds the limit 40 at any point in the event sequence 50, the system 100 may generate a message, which may be, for example, a maintenance indication, a cycle time indication, a signal to modify and/or shutdown a portion or all of the process 10 and/or machinery 12, or the like, as previously described herein.

The baseline, learnt and current heartbeats 32, 36, 38 defined respectively by baseline, learnt and current process cycles performed by the process 10, and prior heartbeats (not shown) defined by prior process cycles performed by the process 10 prior to the current heartbeat 38 may be collected, stored and analyzed using the system 100. Collecting and storing the heartbeats may include collecting and storing the heartbeat data sequences of each respective heartbeat, which may include, for example, a baseline heartbeat data sequence (D1,D2 . . . Dn), a learnt heartbeat data sequence (L1,L2 . . . Ln), and/or a current heartbeat data sequence (C1,C2 . . . Cn) used to respectively define the baseline, learnt and current heartbeats 32, 36, 38. Analyzing the heartbeats may include determining one or more of event variances and/or a cumulative variance between respective heartbeats, and/or comparing a determined variance to a variance limit or tolerance established for the determined variance. For example, analyzing the current heartbeat 38 may include determining one or more current event variances V1 . . . Vn, comparing a current event duration C1 . . . Cn with a respective learnt event duration L1 . . . Ln or a respective baseline event duration D1 . . . Dn, determining a current cumulative variance 42 and/or comparing the current cumulative variance 42 with a cumulative variance limit 40, and the like.

The variance between the baseline, learnt, and current heartbeats 32, 36, 38 may be used to measure, monitor and/or control the process 10 by comparing the variation in the current duration C1 of a respective event, for example, event E1, to the baseline and/or learnt duration D1, L1 of the respective event. In another example, the current cumulative variation 42 of the plurality of events E1 . . . En comprising the process cycle 30 may be compared to the learnt cumulative variation 40 of the plurality of events E1 . . . En. Detailed understanding of variation of event duration of the timed events E1 . . . En and/or the cumulative variance of the plurality of timed events performed by a first identified process cycle of the process 10 relative to at least a second identified process cycle may be used to control and/or improve the process 10 performed by the machinery 12, by identifying significant fluctuations in event duration through variance and/or trend analysis of the heartbeat defined by the first identified process cycle compared to at least a second identified heartbeat defined by a respective identified process, where the at least second identified heartbeat(s) may including one or more prior heartbeats, which may include the learnt and/or baseline heartbeats 36, 32.

Referring again to FIG. 1, the system 100 may be configured to output information related to the process 10, machinery 12, system elements 64, process cycle 30 and/or one or more events E in the process cycle, to an output device, which may be one of the devices 16, 18. The information which is output to the output device 16, 18 can include heartbeat information, process parameter information, messages, and/or a combination thereof. As further described herein, the heartbeat information outputted to the output device 16, 18 can include and/or can be defined by one or more process parameters 70, 72 associated with the heartbeat. Each of the devices 16, 18 may be in communication with or operatively connected to one or more of the server 20, the machinery 12, the controllers 14A, 14B, and/or to each other, in a wireless or wired configuration, and may be configured to exchange information and/or data therebetween. In one example, the device 18 may be a user interface device configured to output information related to the process 10, machinery 12, event duration data and/or process heartbeats derived therefrom, and parameter signal data and/or process parameters derived therefrom. The outputted information may include, by way of non-limiting example, a display of one or more process heartbeats or heartbeat history, which may be displayed textually and/or graphically, event duration information, identified process conditions corresponding to a heartbeat which may include identified process parameters including operation parameters 70 and environment parameters 72, heartbeat variance information including event variance, cumulative variance, variance analysis, trend analysis and other information derived from the event duration information collected from the process 10 and/or machinery 12, messages, alerts, alarms, process parameter variance information including variance and/or conformance of a process parameter 70, 72 relative to one or more parameter limits 74, variance analysis, trend analysis and other information derived from the process parameter information collected from process sensors 34 and system sensors 28, etc. The output device 18 may include at least one of a visual display, audio output, report generator, printer, data port, or other output device configured to receive data from the server 20, through which data may be transferred to a user or another device.

By way of example, the output device 16 may be configured as a signaling or messaging device, and may be configured to output a signal or message to one or more of the process 10, machinery 12, server 20, controller 14, system element 64, output device 16 or other device (not shown) in communication with the messaging device 16. The output device 16 may be configured to output the signal or message as one or more of an electronic, visual, or audible signal or message. The outputted signal or message may include a signal, message or instruction sent to the process 10, machinery 12, system element 64 and/or system 100 to modify or shutdown a portion or all of the process 10, machinery 12, system element 64 and/or system 100, where the signal may be generated in response to a heartbeat defined by the process 10 and/or machinery 12, an operation parameter 70 sensed related to the process 10 and/or machinery 12, an environment parameter 72 sensed related to the system 100, and/or information derived from analysis of one or more of the heartbeat, the operation parameters 70, the environment parameters 72, and/or a combination thereof. In one example, the messaging device 16 may be configured to communicate the signal or message to a user device (not shown), which may be a portable user device such as a smart phone, notebook, laptop or other computing device, to communicate the signal or message to a user of the user device, such that the user may initiate an action in response to the signal or message, where the action may be one of a maintenance action or other action affecting the process 10 and/or machinery 12 and/or an event E of a process cycle performed by the process 10 and/or machinery 12. The example shown in FIG. 1 is intended to be non-limiting, and it would be understood that the functions performed by one or both of the output devices 16, 18 may be performed by another of the devices included in the system 100, such as the server 10, controller 14, etc.

Figure 5:
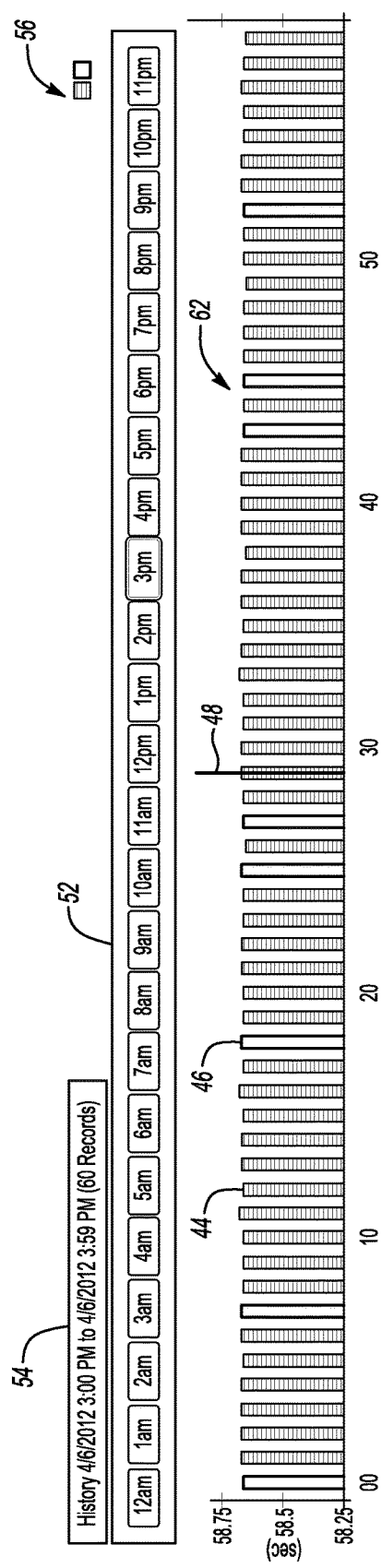
FIG. 5 is a schematic illustration of a sample history of process cycle duration information.

Referring now to FIG. 5, shown is a non-limiting example of a process information display which may be generated by and outputted from the system 100, using the timed event duration data collected from the process 10 over a period of time. The display shown in FIG. 5 may be displayed, for example, by one of the output devices 16, 18, a controller 14A, 14B, or outputted to another device for display. The process information display of FIG. 5 shows a time series 62 of a sampling of process cycle duration measurements taken over a sample period indicated at 54. The sample period 54 may be selected for display from a time period menu 52. In the example shown, the time period menu 52 provides one hour sample period intervals to select from, and a 24 hour period is shown. In the example shown, the sample period 54 is a one hour period from 3:00 pm to 3:59 pm, and the time series 62 is configured to show process cycle duration samples taken at one minute intervals. For example, sample 44 represents the duration of the process cycle performed at 3:13 pm, and sample 46 represents the duration of the process cycle performed at 3:18 pm. It would be understood that the display may be configured for other durations of time period menus 52 and/or sample periods 54, other sample frequencies, etc., to provide different levels of discrimination of the information displayed. For example, the sample period 54 may be a ten minute period with a sampling interval of 20 seconds, to provide a more detailed view of variability in the duration of the process cycles of the process 10.

The process cycle duration, as shown in FIG. 5, represents the total duration of a process cycle. Using the example of the baseline cycle 30 shown in FIG. 2 and the example data provided in Table 1, the total duration of the baseline process cycle 30 would be the summation of the durations D1 . . . Dn of the timed events E1 . . . En comprising the process cycle 30. For the example shown in FIG. 2 and Table 1, the total duration of the baseline process cycle 30 would be 60, e.g., the summation of the baseline event durations (3, 4, 3, 4, 10, 22, 4, 3, 4, 3). Referring again to FIG. 5, a cursor or selector 48 may be configured to allow a user to select a process cycle sample in the series 62 to retrieve additional information. In the example of FIG. 5, the selector 48 has selected the process cycle performed at 3:32 pm, which may prompt the system 100 to provide detailed information, which may include, for example, a display of event duration information similar to that shown in FIGS. 4A and/or 4B, for the selected process cycle.

Each sample in the time series 62 may be visually coded according to a key 56 to provide additional information to the user viewing the display. In the example shown, the key 56 includes a cross-hatched bar and a solid bar, each which may represent a different condition. For example, the samples displayed by a cross-hatched bar may represent samples, such as the sample 44, for which the heartbeat variance is within an acceptable limit. Samples displayed by a solid bar may represent samples, such as the sample 46, where the heartbeat variance is outside an acceptable limit. Further visual indicators may be included. For example, the solid bar may be a first color to indicate an event variance is outside an acceptable limit for the sample, and the solid bar may be a second color to indicate the cumulative variance is outside an acceptable limit for the sample. The example shown in not intended to be limiting. By displaying a time series 62 of process cycle durations over a sample period 54, a visual indication of the variability of and trending in process cycle duration over multiple process cycles performed by the process 10 may be provided. Such an analysis may be useful, for example, to look for trends corresponding to changes in operating conditions and/or operation parameters 70 of the process 10 and/or machinery 12, which may include changes in environmental factors and/or environment parameters 72 such as temperature or power fluctuations from one time period to another, process or tooling changes, set-up or maintenance events, changes in incoming material or workpiece parameters, etc.

Figure 6:
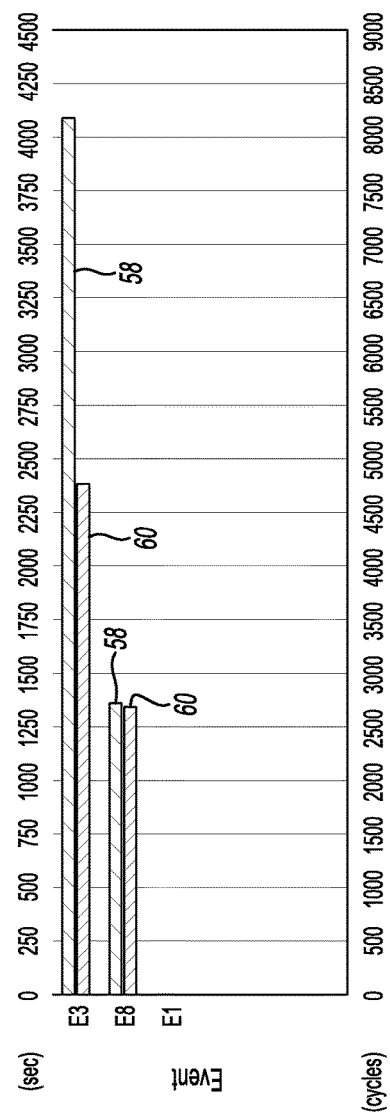
FIG. 6 is a schematic illustration showing over cycle frequency and accumulated variance by timed event.

Referring now to FIG. 6, shown is another non-limiting example of a process information display which may be generated by and outputted from the system 100, using the timed event duration data collected from the process 10 over a period of time. The display shown in FIG. 6 may be displayed, for example, by one of the output devices 16, 18, a controller 14A, 14B, or outputted to another device for display. The process information display of FIG. 6 shows an over cycle frequency 58 and an accumulated variance 60 for one or more individual timed events in the process sequence 50. The over cycle frequency 58 refers to the number of times the duration of the timed event has exceeded the duration of a reference event measured during performance of a reference cycle. By example, the over cycle frequency of the timed event E3 shown in FIG. 6 may represent the number of times (frequency) during a sample period (not shown) of process operation that the current duration C3 of each the timed event E3 performed during the sample period exceeded the learnt duration L3 of the event E3, where the reference cycle is the learnt cycle. The accumulated variance 60 refers to the summation of the event variances of the timed event over the sample period relative to the reference event. By example, the accumulated variance of the timed event E3 shown in FIG. 6, where the reference cycle is the learnt cycle, would be the summation of the current variances V3 measured for the process cycles performed during the sample period, which would indicate the total productive time loss attributable to variance of the timed event E3 during the sample period.

Other information may be provided by FIG. 6. For example, the average variance per over cycle may be visually approximated for each timed event. As shown for timed event E8, during the sample period shown, the variance of timed event E8 averaged approximated 0.5 seconds per over cycle. The timed events may be displayed in ranked order according to the event's frequency of over cycles and/or accumulated variance, for example, in the order E3, E8, E1 in FIG. 6, to facilitate identification of those events to be prioritized for investigation and/or corrective action. Other displays, including displays of tabular data and/or other graphical analysis, of the event duration, cycle duration, heartbeat and/or data derived therefrom may be provided, and the examples shown are not intended to be limiting.

Figure 7:
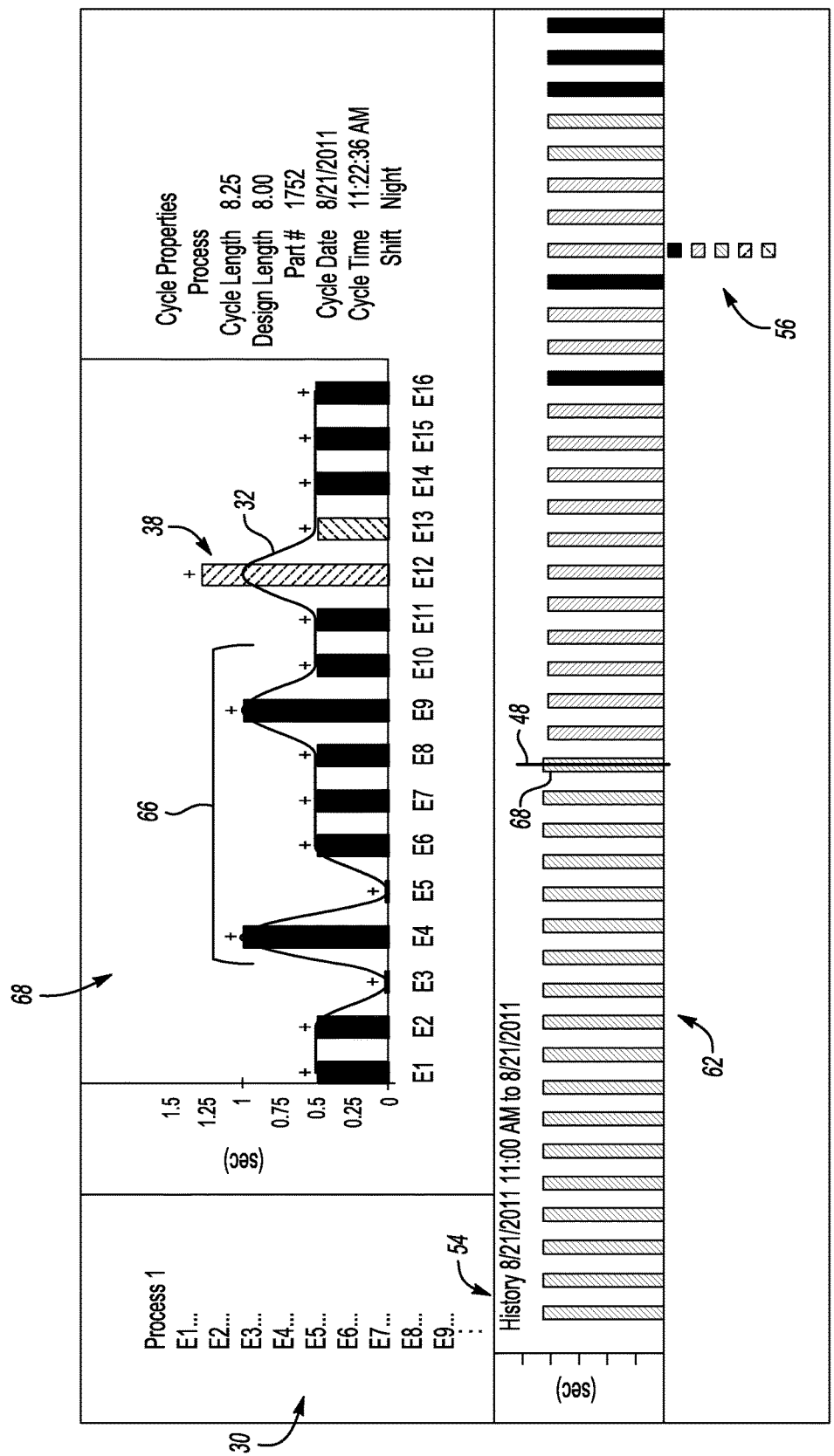
FIG. 7 is a schematic illustration of process cycle displaying a current heartbeat, a baseline heartbeat, and a sample history of duration information for the process cycle.

Referring to FIG. 1 and in non-limiting example shown in FIGS. 7-15, a process operation 66 of a process cycle 30 is described in an illustrative example as a metal cutting operation 66 performed by machine 12B, where a plurality of operation parameters 70A, 70B, 70C, 70D are sensed, respectively, by process sensors 34A, 34B, 34C, 34D in communication with the controller 14B and the server 20. The operation parameters 70 in the illustrative example, and further shown in FIG. 8, include a cutting tool temperature 70A, a tool rotation speed in rotations per minute (RPM) 70B, a tool torque 70C, and a cutting depth 70D, where the cutting depth indicates the depth the cutting tool has cut into the workpiece at the indicated time in the process cycle 30. The process cycle 30 includes a plurality of events E1, E2, etc. as shown in FIG. 7, which include events E4, E5, E6, E7, E8, E9 and E10 (E4 . . . E10) of the process operation 66, where the process operation 66 in the illustrative example has a baseline cycle length of 4 seconds.

Referring now to FIG. 7, a process information display is shown which can be generated by and outputted from the system 100, using the timed event duration data and corresponding process parameter data collected from the process 10 over a period of time. The display includes a current heartbeat 38 of the process cycle 30 including the process operation 66, displayed as a bar graph, and a baseline heartbeat 32 displayed as a continuous line chart, where the current and baseline heartbeats 38, 32 have been generated as previously described herein. Also shown is a time series 62, generated from event duration data measured for a plurality of process cycles, as previously described for FIG. 5, showing a sampling of process cycle duration measurements taken over the sample period indicated at 54. Cursor 48 identifies the process cycle sample 68 corresponding to the current heartbeat 38 displayed in FIG. 7.

Figure 8:
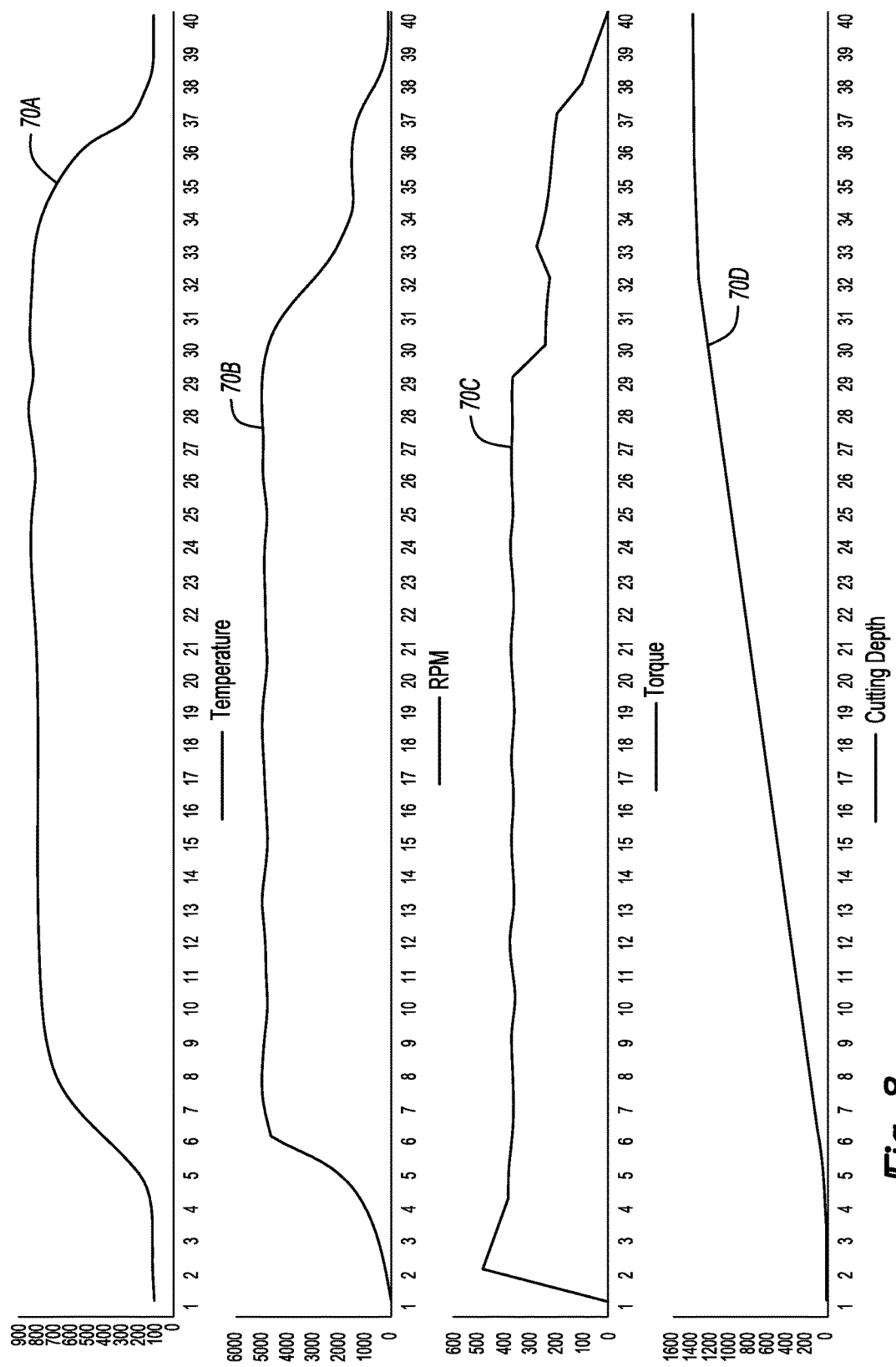
FIG. 8 is a schematic illustration of a plurality of process operation parameters sensed for a process operation of the process cycle shown in FIG. 7.

FIG. 8 is a schematic illustration of the plurality of process operation parameters 70 sensed for the process operation 66 of the process cycle shown in FIG. 7, where each of the sensed operation parameters 70A, 70B, 70C and 70D is displayed as a separate continuous line graph, where the horizontal axis indicates the elapsed time (in tenths of a second in the present example) during performance of the operation 66, and the vertical axis indicates the value of the operation parameter 70 at the elapsed time during performance of the process cycle 30. As previously described herein, each of the operation parameters 70A, 70B, 70C and 70D is sensed by a respective process sensor 34A, 34B, 34C, and 34D during performance of the process cycle 30, which in the illustrative example is the process operation 66, and a parameter signal is output from each respective process sensor 34A, 34B, 34C, and 34D to the controller 14B and/or to the server 20, where the parameter signal corresponds to the value of the operation parameter 70 at the time the operation parameter is sensed. In an illustrative example, the parameter signal is an analog signal, such that the operation parameter 70 defined by the parameter signal can be determined by the controller 14B and/or the server 12 at each point in time during performance of the process operation 66, and associated with the corresponding event duration data of one or more of the events E4 . . . E10 of the process operation 66 in real time, for use in analyzing and understanding variation between the current heartbeat 38 and the baseline heartbeat 32, variation in the timed duration of one or more of the events E4 . . . E10, and/or variation in the operation parameter 70.

Figure 9:
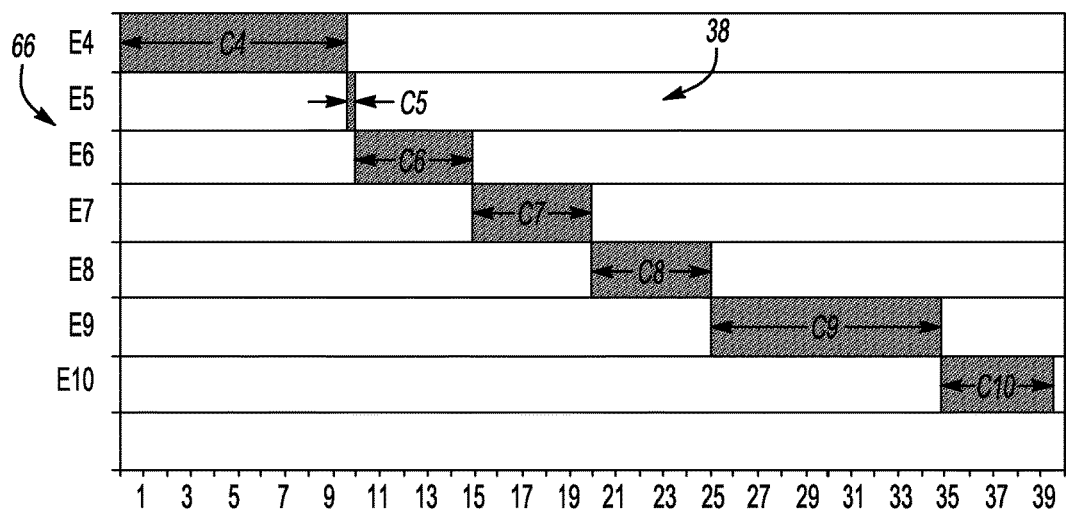
FIG. 9 is a schematic illustration showing the current heartbeat of the process operation shown in FIG. 7 with the event durations displayed in sequenced order.
Figure 10:
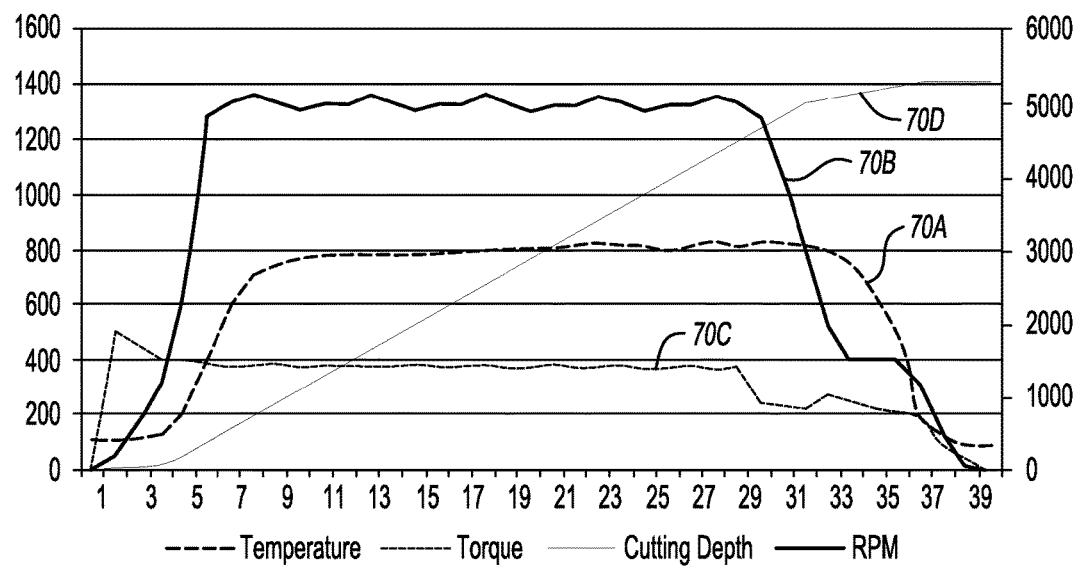
FIG. 10 is a schematic illustration of a composite view of the operation parameters of FIG. 8 sensed during the process operation of FIG. 9.
Figure 11:
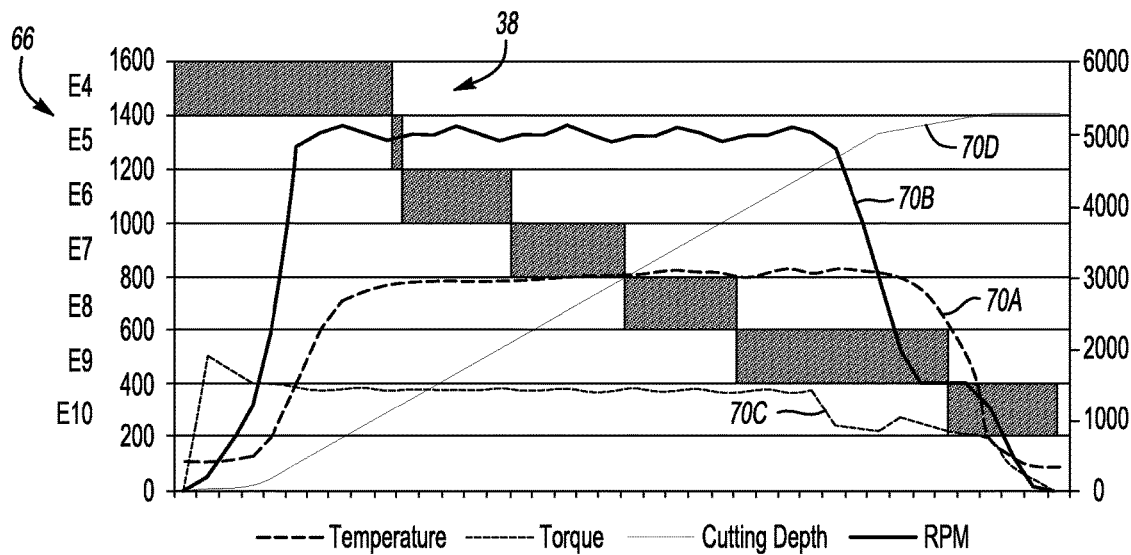
FIG. 11 is a schematic illustration of an example composite view of the operation parameters and the heartbeat of the process operation.

As shown in FIGS. 7-12, the event duration data of the heartbeats 32, 38 and the corresponding operation parameter data for operation parameters 70*a*, 70B, 70C and 70D can be generated by the server 20 and outputted from the system 100 in the form of one or more information displays, where the server 20 and/or the system 100 can be configured to output the current heartbeat 38 and corresponding process parameter data, e.g., the operation parameters 70A, 70B, 70*c* and 70D in the present example, in real time with performance of the corresponding process cycle 30. Referring to FIG. 9, the current heartbeat 38 of FIG. 7 is displayed in a sequence of events chart generated as described for FIG. 2, where the horizontal axis indicates the time (in tenths of a second in the illustrative example) elapsed during performance of the process operation 66, and showing the duration D of each event E of the process operation 66 shown on the vertical axis. In the current example, the first event E4 of the current heartbeat 38 of the process operation 66 shown in FIG. 9 has an event duration D4 of 0.95 seconds, the second event E5 has an event duration D5 of 0.05 seconds, and so on. Referring to FIG. 10, shown is a schematic illustration of a composite view of the operation parameters 70A, 70B, 70C 70D sensed during performance of the current process operation 66 from which the heartbeat shown in FIG. 9 was generated, such that the FIGS. 9 and 10 together provide a visual display of the variation in the operation parameters 70A, 70B, 70C, 70D during the performance of each of the operation events E4 . . . E10. In another example, the heartbeat 38 and operation parameters 70A-70D can be overlaid in one display window as shown in FIG. 11.

Additional information, including variance information for the heartbeat 38 and/or conformance information for one or more of the operation parameters 70 can be generated and provided in a visual display as shown in FIG. 12. Analysis of the heartbeat data, the operation parameter data, and/or the combination of the heartbeat and operation parameter data can be performed to understand variation in the process 10, perform diagnostics, determine causes of a process condition or variation, control the process 10, identify and/or predict process concerns, and/or initiate corrective and/or preventive actions to mitigate process issues, including process downtime. Analysis of the heartbeat data, the operation parameter data, and/or the combination of the heartbeat and operation parameter data can be performed to generate messages which can be output by the system 100 to an output device 16, 18 which can include a user display, and/or transmitted to a messaging device or to one or more of the machinery 12, controller 14, process 10, and system elements 64, for example, as an instruction, alert or shutdown signal.

As shown in FIG. 12, the current heartbeat 38 can be displayed as an overlay to a baseline heartbeat 32, to visually indicate variation between the current and baseline heartbeats 32, 38. FIG. 12 shows each event E4 . . . E10 of the process operation 66 in a sequence of events display. In the illustrative example, the baseline heartbeat 32 is the design intent heartbeat and is shown in FIG. 12 by displaying the design intent duration D of each of the events E. The current heartbeat 38 is also shown in FIG. 12, by displaying the current duration C of each if the events E. For example, for event E4, the current event duration C4 is less than the design intent duration D4 of event E4, indicating a variance has occurred during the performance of event E4 of the current heartbeat 32. FIG. 12 also shows each of the operation parameters 70A, 70B, 70C, 70D displayed with respective parameter limits 74, where the respective parameter limits 74 are established as previously described herein. The composite view of the event durations C, D, the heartbeats 32, 38 and the operation parameters 70 shown in FIG. 12 can be used to visually monitor and analyze the performance conditions of the current process operation 66 in real time. For example, the variance of the current event duration C4 of event E4 from the design intent duration D4 could be visually analyzed looking at the behavior of the operation parameters 74 during the first second of elapsed time of the process cycle, e.g., at the elapsed time from t=0 through t=10, where time is shown in tenth second increments on the horizontal axis. It can be observed that operation parameter 70C, the tool torque, is operating above the preferred limit 74B, and operation parameter 70D, the cutting depth, is trending ahead of the baseline parameter limit 74C. Analyzing the combination of the variance of event duration C4 to D4, the tool torque above the preferred limit, and the variance of the cutting depth 70D deeper than the baseline cutting depth limit 74C, it may be surmised that the cutting tool engaged the workpiece aggressively, causing the increase in torque, and increasing the initial depth of cut beyond the expected level. Such an observation may indicate further investigation to mitigate any detrimental effects which may occur due to the higher torque, such as increased tool wear, and/or to validate any opportunities for decreasing cycle time by repeating the conditions causing the reduction in current event duration C4 relative to the design event duration D4.

Figure 13:
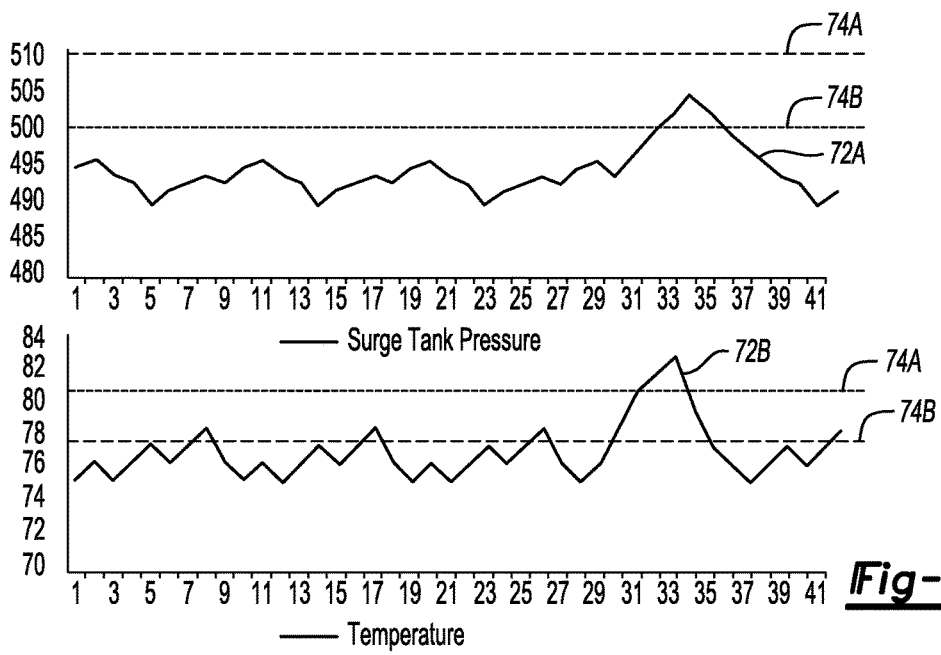
FIG. 13 is a schematic illustration of a plurality of system environment parameters sensed during the process segment of the process cycle shown in FIG. 7.
Figure 14:
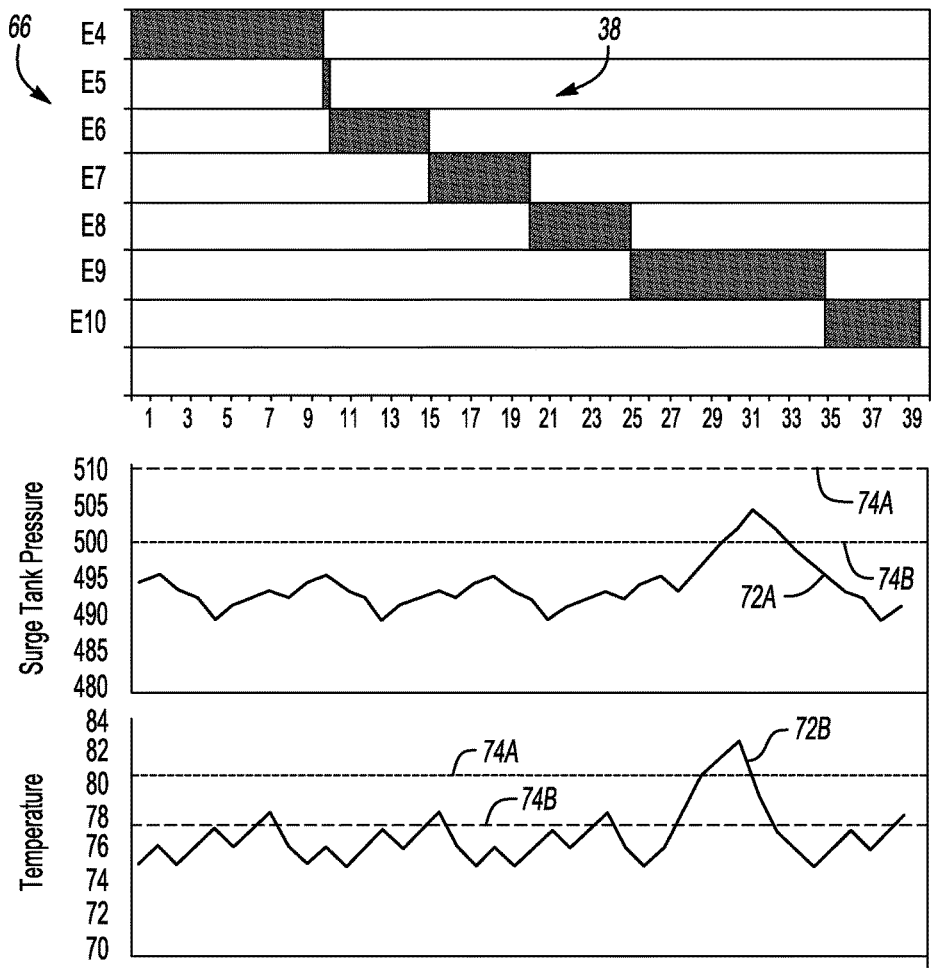
FIG. 14 is a schematic illustration of an example composite view of the environment parameters and the heartbeat of the process operation.
Figure 15:
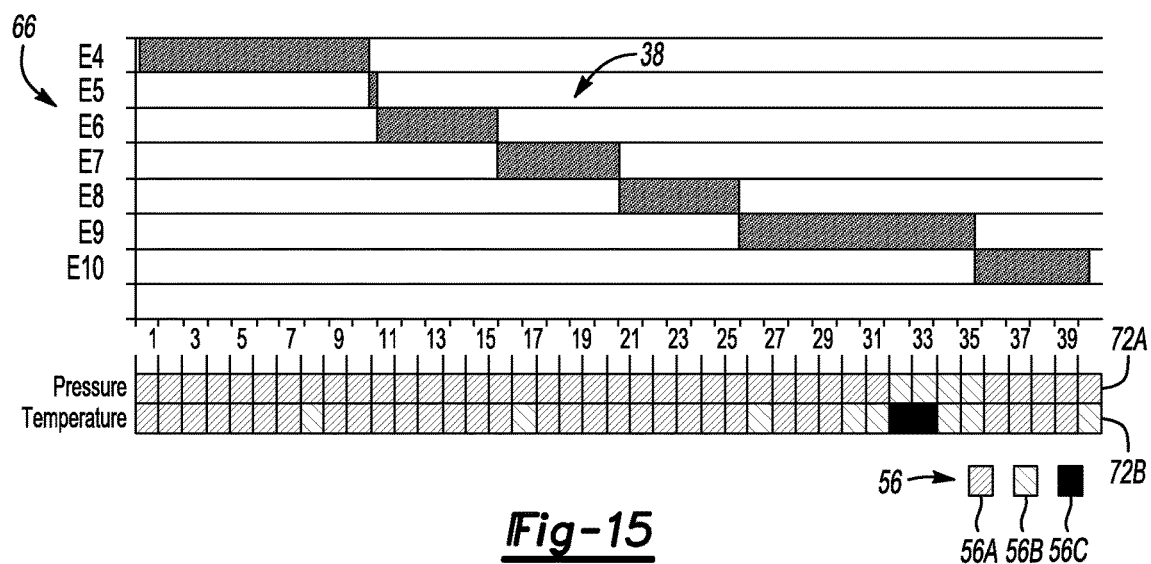
FIG. 15 is a schematic illustration of another example composite view of the environment parameters and the heartbeat of the process operation.

FIGS. 13-15 illustrate examples of information displays which include the current heartbeat 38 and a plurality of environment parameters 72. In the examples shown in FIGS. 13-15, the event duration data of the current heartbeat 38 and the corresponding environment parameter data for environment parameters 72A and 72B are generated by the server 20 and outputted from the system 100 for display, where the server 20 and/or the system 100 can be configured to output the current heartbeat 38 and corresponding process parameter data, e.g., the environment parameters 72A, 72B in the present example, in real time with performance of the corresponding process cycle 30. Referring to the figures, FIG. 13 illustrates a first environment parameter 72A, which in an illustrative example is the surge tank pressure of a surge tank included in the system element 64A, where system element 64A is a hydraulic system providing hydraulic pressure to the process 10 for operation of hydraulically actuated elements within the process 10, and the surge pressure is sensed by a system sensor 28A. The surge tank pressure 72A is monitored relative to a maximum pressure limitation 74A and an alert pressure limitation 74B, where any occurrence of a surge pressure above the alert pressure limitation 74B will cause the server 20 to output an alert or warning to investigate and/or take appropriate action to correct the surge pressure. In the present example, the server 20 may be configured to shut down or reduce the pressure of the hydraulic system element 64A when the surge pressure parameter 72A reaches or exceeds the maximum parameter limit 72A.

A second environment parameter 72B is displayed, which in the current example is an ambient temperature sensed by a system temperature sensor 28C in communication with the server 20. The environment parameter 72B is monitored relative to a first parameter limit 74B, which in the present example corresponds to an alert limit such that when the ambient temperature sensed by sensor 28C exceeds the alert limit 74B, an alert is output from the server 20, and/or the server 20 initiates actions, such as modification of the ventilation system for the facility housing the process 10, to reduce the ambient temperature below the temperature corresponding to the alert limit 74B. In the example shown, the second parameter limit 74A corresponds to an escalated alert limit, such that when the ambient temperature sensed by sensor 28C exceeds the escalated alert limit 74A, an escalated alert is output from the server 20, and/or the server 20 initiates an increased level of actions to reduce the ambient temperature below the temperature corresponding to the escalated alert limit 74A.

As shown in FIG. 14, the environment parameters 72A, 72B and parameter limits 74A, 74B are displayed in continuous line graph format. FIG. 15 illustrates another example format for the display of the heartbeat data with the environment parameter data. As shown in FIG. 15, the current heartbeat 38 is displayed as a sequence of events, and the environment parameters 72A, 72B are displayed in a keyed grid format, where each cell of the grid is coded to correspond with the key 56. For example, the key 56 includes a narrowly cross-hatched cell 56A which indicates the environment parameter 72 is conforming relative to the parameter limits 74 of that environment parameter 72. The key 56, in the example shown, includes a widely cross-hatched cell 56B which indicates the environment parameter 72 is non-conforming and, in the illustrative example, has exceeded an alert limit 74B. A solid cell 56C in the key 56 indicates the environment parameter 72 is non-conforming and, in the illustrative example, has exceeded a maximum limit 74A. The cells of the parameter grid shown in FIG. 15 can also be color coded, for example, key cell 56A may be colored green to indicate the environment parameter 72 is conforming relative to the parameter limits 74 of that environment parameter 72, key cell 56B may be colored yellow to indicate the environment parameter 72 has exceeded an alert limit 74B, and key cell 56C may be colored red to indicate the environment parameter 72 has exceeded a maximum limit 74A, providing a visual indication of the status of each environment parameter 72A, 72B relative to the current heartbeat 38 and in real time.

Analysis of the heartbeat data, the environment parameter data, and/or the combination of the heartbeat and environment parameter data can be performed, for example, by the server 20, to understand variation in the process 10, perform diagnostics, determine causes of a process condition or variation, control the process 10, identify and/or predict process concerns, and/or initiate corrective and/or preventive actions to mitigate process issues, including process downtime. Analysis of the heartbeat data, the environment parameter data, and/or the combination of the heartbeat and environment parameter data can be performed to generate messages which can be output by the system 100 to a user display or transmitted to a messaging device or to the machinery, for example, as an instruction, alert or shutdown signal.

The event duration data defining the heartbeats 32, 36, 38, the operation signal data output by the process sensors 34 to generate the operation parameters 70, and the environment signal data output by the system sensors 28 to generate the environment parameters 72 can be received by the server 20 and saved to the memory 24 and/or in databases 26 such that the data can be used, individually and/or in combination, to analyze variation in the process 10, including variation caused by variability in the system 100.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A method for generating a heartbeat of a process characterized by a process parameter and including a process cycle performed by at least one machine, the process cycle including a plurality of timed events performed in a process sequence by the at least one machine, the method comprising:
performing a process cycle of a process;
wherein the process cycle is performed by at least one machine in a system;
receiving, via a server in communication with the at least one machine, event duration data from the at least one machine;
receiving, via the server in communication with a sensor, a parameter signal outputted from the sensor;
wherein the sensor is configured to sense a process parameter during performance of the process cycle by the machine, such that the parameter signal indicates a value of the process parameter in real time with the performing of the process cycle;
wherein the server is programmed to:
determine, using the event duration data, a duration of each of a plurality of timed events performed in a process sequence during the process cycle;
order the durations of the plurality of timed events in the process sequence;
generate a heartbeat for the process cycle, wherein the heartbeat is defined by the ordered durations;
determine, using the parameter signal, the value of the process parameter; and
associate, in real time, the value of the process parameter with the heartbeat;
the method further comprising:
generating, via the server, the heartbeat defined by the ordered durations;
determining, via the server and using the parameter signal, the value of the process parameter; and
associating, via the server in real time, the process parameter with the heartbeat.

2. The method of claim 1, wherein the process parameter is an operation parameter defined by the process.

3. The method of claim 1, wherein the process parameter is an environment parameter defined by the system.

4. The method of claim 1, further comprising:
identifying a baseline duration of each of the plurality of timed events of the process cycle;
ordering the baseline durations of the plurality of timed events in the process sequence; and
generating, via the server, a baseline heartbeat defined by the ordered baseline durations of the process cycle.

5. The method of claim 4, wherein the baseline duration of each of the plurality of timed events is a design intent duration of the respective event.

6. The method of claim 4, wherein the baseline duration of each of the plurality of timed events is a learnt duration of the respective event;
the method further comprising:
performing a learnt process cycle under a learnt condition;
wherein the learnt process cycle is performed by the at least one machine;

measuring a learnt duration of each of the plurality of timed events performed in the process sequence during the learnt process cycle;

ordering the learnt durations of the plurality of timed events in the process sequence; and generating, via a server, a learnt heartbeat defined by the ordered learnt durations.

7. The method claim 6, further comprising:

identifying a parameter limit of the process parameter; and controlling the process parameter within the parameter limit during performance of the learnt process cycle to provide a known process parameter;

wherein the learnt condition is at least partially defined by the known process parameter.

8. The method of claim 4, further comprising:

performing a current process cycle under a current condition;

measuring a current duration of each of the plurality of timed events performed in the process sequence during the current process cycle;

ordering the current durations of the plurality of timed events in the process sequence; and generating, via the server, a current heartbeat defined by the ordered current durations.

9. The method of claim 8, further comprising:

sensing the process parameter, via the sensor in communication with the server, during the current process cycle;

wherein the value of the process parameter sensed during the current process cycle is a current value of the process parameter;

associating, via the server, the current value of the process parameter with the current heartbeat.

10. The method of claim 9, further comprising at least one of:

determining a current event variance between the current duration and the baseline duration for each of the plurality of timed events;

determining a current cumulative variance between the current heartbeat and the baseline heartbeat; and comparing the current process parameter to a parameter limit of the process parameter.

11. The method of claim 10, further comprising:

generating a message in response to one of the current event variance, the current cumulative variance, and the comparison of the current value of the process parameter to the parameter limit.

12. The method of claim 11, wherein the message is at least one of:

a maintenance indicator;

a cycle time indicator; and a shutdown signal.

13. The method of claim 1, wherein the process parameter is a time dependent parameter.

14. The method of claim 1, wherein the process parameter is a time independent parameter.

15. The method of claim 1, wherein the server is programmed to initiate a control action to control at least one of the machine and the process parameter;

the method further comprising:

determining the control action using at least one of the heartbeat and the value of the process parameter associated with the heartbeat; and outputting the control action to the at least one of the machine and the process parameter.

16. The method of claim 1, further comprising:

outputting, via the server, the heartbeat and the value of the process parameter to an output device; and displaying, via the output device, the heartbeat and the value of the process parameter associated with the heartbeat in real time.

17. A system for generating a heartbeat of a process characterized by a process parameter and including a process cycle performed by at least one machine, the process cycle including a plurality of timed events performed in a process sequence by the at least one machine, the system comprising:

at least one sensor for sensing a process parameter during the process cycle and outputting a parameter signal corresponding to the process parameter;

a server in communication with the at least one machine and the at least one sensor;

wherein the server is programmed to:

generate a heartbeat for the process cycle, wherein the server is programmed to generate the heartbeat by:

receiving event duration data from the at least one machine;

determining, using the event duration data, a duration of each of the plurality of timed events performed in the process sequence during the process cycle;

ordering the durations of the plurality of timed events in the process sequence; and generating a heartbeat for the process cycle, wherein the heartbeat is defined by the ordered durations;

receive the parameter signal from the at least one sensor;

determine a value of the process parameter using the parameter signal; and associate, in real time, the value of the process parameter with the heartbeat.

18. The system of claim 17, wherein:

the process cycle is a current process cycle;

the heartbeat is a current heartbeat of the current process cycle;

the parameter signal is a current parameter signal of the current process cycle; and the server is configured to, during performance of the current process cycle and in real time:

generate the current heartbeat;

generate the current value of the process parameter; and associate the current heartbeat and the current value of the process parameter.

19. The system of claim 18, wherein the server is configured to perform at least one of:

determine a current event variance between the current duration and a baseline duration for each of the plurality of timed events;

determine a current cumulative variance between the current heartbeat and a baseline heartbeat; and compare the current value of the process parameter to a parameter limit of the process parameter.

20. The system of claim 19, further comprising:

a user interface in communication with the server and configured to receive and display the current heartbeat and the current value of the process parameter in real time during the current process cycle.

21. The system of claim 20, wherein the server is configured to generate a message in response to one of the current event variance, the current cumulative variance, and the comparison of the current value of the process parameter to the parameter limit; and to output the message on the user interface.

22. The system of claim 21, wherein the message is at least one of:
a maintenance indicator;
a cycle time indicator; and
a shutdown signal.

23. The system of claim 17, wherein the sensor is a process sensor for sensing an operation parameter of the process.

24. The system of claim 17, wherein the sensor is a system sensor for sensing an environment parameter of the system.

25. The system of claim 17, wherein the server is programmed to initiate a control action to control at least one of the machine and the process parameter; and
   to output the control action to the at least one of the machine and the process parameter.

\* \* \* \* \*